United States Patent
Liu et al.

(10) Patent No.: US 10,440,705 B2
(45) Date of Patent: Oct. 8, 2019

(54) METHOD, APPARATUS, SERVER, AND SYSTEMS OF TIME-REVERSAL TECHNOLOGY

(71) Applicant: Origin Wireless, Inc., Greenbelt, MD (US)

(72) Inventors: K. J. Ray Liu, Potomac, MD (US); Hung-Quoc Duc Lai, Parkville, MD (US); Beibei Wang, Clarksville, MD (US); Qinyi Xu, Greenbelt, MD (US); Chen Chen, College Park, MD (US); Feng Zhang, Greenbelt, MD (US); Yi Han, Ellicott City, MD (US); Zhung-Han Wu, Laurel, MD (US); Zoltan Safar, Ellicott City, MD (US); Oscar Chi-Lim Au, San Jose, CA (US)

(73) Assignee: Origin Wireless, Inc., Greenbelt, MD (US)

( * ) Notice: Subject to any disclaimer, the term of this patent is extended or adjusted under 35 U.S.C. 154(b) by 338 days.

(21) Appl. No.: 15/384,217

(22) Filed: Dec. 19, 2016

(65) Prior Publication Data

US 2017/0188359 A1    Jun. 29, 2017

Related U.S. Application Data

(60) Continuation-in-part of application No. 13/706,342, filed on Dec. 5, 2012, now Pat. No. 9,883,511, and a
(Continued)

(51) Int. Cl.
*H04W 24/08* (2009.01)
*H04W 72/04* (2009.01)
*H04W 72/08* (2009.01)

(52) U.S. Cl.
CPC ..... *H04W 72/0446* (2013.01); *H04W 72/042* (2013.01); *H04W 72/0413* (2013.01); *H04W 72/085* (2013.01)

(58) Field of Classification Search
CPC ......... H04W 72/0446; H04W 72/0413; H04W 72/042; H04W 72/085; H04W 72/0453;
(Continued)

(56) References Cited

U.S. PATENT DOCUMENTS 2,933,702 A    4/1960    Bogert
3,767,855 A   10/1973    Ueno et al.
(Continued)

FOREIGN PATENT DOCUMENTS

EP    2 571 214 A1    11/2012
WO    WO 2007/031088    3/2007
(Continued)

OTHER PUBLICATIONS

Abbasi-Moghadam, D. et al., "A SIMO one-bit time reversal for UWB communication systems", EURASIP J. Wireless Comm. and Networking, 2012:113, 2012.
(Continued)

*Primary Examiner* — Un C Cho
*Assistant Examiner* — Rasha K Fayed
(74) *Attorney, Agent, or Firm* — Fish & Richardson P.C.

(57) ABSTRACT

A time-reversal wireless system comprising a first wireless transceiver of a time-reversal client, one or more second wireless transceiver and/or a time-reversal client with the first wireless transceiver. The first wireless transceiver of the time-reversal client is wirelessly coupled to the one or more second wireless transceiver through a wireless broadband multipath channel associated with a space. The time-reversal client contains the first wireless transceiver. The time-
(Continued)

reversal client also contains a processor and a memory configured to obtain a set of channel state information (CSI) in a channel probing phase, and/or to obtain a set of location-specific signatures based on the set of CSI and/or a time reversal operation in a channel probing phase. The set of CSI is captured when one or more probing signal is sent either from the first wireless transceiver to each of the at least one second wireless transceiver, or from each of the at least one second wireless transceiver to the first wireless transceiver, through the wireless broadband multipath channel associated with the space. A channel passband with bandwidth W0 is associated with the wireless broadband multipath channel. A first passband with bandwidth W1 is associated with the first wireless transceiver. The W1 is not larger than W0 such that the first passband is part of the channel passband. One or more second passband is associated with the one or more second wireless transceiver such that a bandwidth W2 associated with each of the one or more second passband is not larger than W1 such that the each of the one or more second passband is part of the first passband. Each of the set of CSI include a channel impulse response, a channel frequency response, and/or another channel state data of the wireless broadband multipath channel.

18 Claims, 14 Drawing Sheets

Related U.S. Application Data continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, which is a division of application No. 14/183,648, filed on Feb. 19, 2014, now Pat. No. 9,313,020, application No. 15/384,217, which is a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, application No. 15/384,217, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, application No. 15/384,217, which is a continuation-in-part of application No. 14/605,611, filed on Jan. 26, 2015, now Pat. No. 10,168,414, application No. 15/384,217, which is a continuation-in-part of application No. 14/615,984, filed on Feb. 6, 2015, now Pat. No. 9,686,054, and a continuation-in-part of application No. 15/004,314, filed on Jan. 22, 2016, now Pat. No. 10,014,982, application No. 15/384,217, which is a continuation-in-part of application No. 15/061,059, filed on Mar. 4, 2016, application No. 15/384,217, which is a continuation-in-part of application No. PCT/US2015/041037, filed on Jul. 17, 2015, application No. 15/384,217, which is a continuation-in-part of application No. 15/268,477, filed on Sep. 16, 2016, now Pat. No. 9,887,864, application No. 15/384,217, which is a continuation-in-part of application No. 15/284,496, filed on Oct. 3, 2016, application No. 15/384,217, which is a continuation-in-part of application No. PCT/US2016/066015, filed on Dec. 9, 2016.

(60) Provisional application No. 62/069,090, filed on Oct. 27, 2014, provisional application No. 62/025,795, filed on Jul. 17, 2014, provisional application No. 62/106,395, filed on Jan. 22, 2015, provisional application No. 62/128,574, filed on Mar. 5, 2015, provisional application No. 62/148,019, filed on Apr. 15, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/307,081, filed on Mar. 11, 2016, provisional application No. 62/316,850, filed on Apr. 1, 2016, provisional application No. 62/383,235, filed on Sep. 2, 2016, provisional application No. 62/411,504, filed on Oct. 21, 2016, provisional application No. 62/331,278, filed on May 3, 2016, provisional application No. 62/320,965, filed on Apr. 11, 2016, provisional application No. 62/295,970, filed on Feb. 16, 2016, provisional application No. 62/307,172, filed on Mar. 11, 2016, provisional application No. 62/409,796, filed on Oct. 18, 2016, provisional application No. 62/334,110, filed on May 10, 2016, provisional application No. 62/322,575, filed on Apr. 14, 2016, provisional application No. 62/384,060, filed on Sep. 6, 2016.

(58) Field of Classification Search
CPC .......... H04W 72/0473; H04W 52/143; H04W 52/247; H04W 52/34; H04W 52/242; H04W 52/346; H04W 52/14; H04W 64/00; H04W 84/18; H04W 24/08; H04W 24/00; H04L 5/0057; H04L 5/00; H04L 5/69; H04L 25/03343; H04L 25/0206; H04L 25/0224; H04L 25/0212; H04L 25/0204; H04L 25/0226; H04L 25/0202; H04L 25/0228; H04L 25/0244; H04L 1/0057; H04L 1/0693; H04L 1/0003; H04L 1/16; H04L 2025/03414; H04L 2025/0377; H04L 2025/03802; H04L 27/0014; H04L 27/2646; H04L 27/06; H04L 27/2657; H04L 27/2675; H04L 27/2663; H04L 27/2665; H04L 27/2678; H04L 27/367; H04L 12/1845; H04L 12/56; H04L 12/28; H04B 7/0626; H04B 7/0834; H04B 7/0617; H04B 7/24; H04B 7/0413; H04B 7/02; H04B 7/00; H04B 7/005; H04B 7/022; H04B 7/0615; H04B 7/0636
USPC ................ 370/330, 252; 375/227, 224, 343; 455/522, 420, 63.1, 43, 69
See application file for complete search history.

(56) References Cited

U.S. PATENT DOCUMENTS

| | | |
|---|---|---|
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |

(56) References Cited

U.S. PATENT DOCUMENTS

| | | | |
|---|---|---|---|
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 9,226,304 | B2 | 12/2015 | Chen et al. |
| 9,313,020 | B2 | 4/2016 | Ma et al. |
| 9,559,874 | B2 * | 1/2017 | Han .................. H04L 25/03012 |
| 9,883,511 | B1 * | 1/2018 | Yang .................. H04W 72/0473 |
| 2003/0036359 | A1 * | 2/2003 | Dent ...................... H04B 7/005 455/63.1 |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2010/0302977 | A1 | 12/2010 | Huy et al. |
| 2010/0309829 | A1 | 12/2010 | Huy et al. |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1 * | 10/2012 | Smith ................. H04L 25/0212 375/224 |
| 2012/0263056 | A1 | 10/2012 | Smith et al. |
| 2012/0328037 | A1 * | 12/2012 | Hsu .......................... G01S 1/725 375/267 |
| 2013/0201958 | A1 | 8/2013 | Huy et al. |
| 2013/0223503 | A1 * | 8/2013 | Smith ................. H04L 25/0212 375/227 |
| 2013/0301411 | A1 * | 11/2013 | Yoshida ................ H04W 24/08 370/231 |
| 2014/0022128 | A1 * | 1/2014 | Smith .................... G01S 5/0273 342/465 |
| 2014/0126567 | A1 | 5/2014 | Husain et al. |
| 2014/0185596 | A1 | 7/2014 | Han et al. |
| 2015/0049745 | A1 | 2/2015 | Han et al. |
| 2015/0049792 | A1 | 2/2015 | Han et al. |
| 2015/0312081 | A1 | 10/2015 | Yang et al. |
| 2016/0018508 | A1 | 1/2016 | Chen et al. |
| 2016/0021670 | A1 | 1/2016 | Yang et al. |
| 2016/0081060 | A1 | 3/2016 | Chen et al. |
| 2016/0316454 | A1 | 10/2016 | Chen et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Albert, D. G. et al., "Time Reversal processing for source location in an urban environment (L)", J. Acoust. Soc. Am., vol. 118(2):616-619, Aug. 2005.

Brysev, A. P. et al., "Wave phase conjugation in ultrasonic beams", Physics-Uspekhi, vol. 41(8):793-805, 1998.

Chang, Y.-H. et al., "Ultrawideband Transceiver Design Using Channel Phase Precoding", IEEE Trans. Sig. Proc., vol. 55(7):3807-3822, Jul. 2007.

Chen, Y. et al., "Time-reversal wideband communications," IEEE Signal Processing Letters, vol. 20(12):1219-1222, Dec. 2013.

Chen, Y. et al., "Time-Reversal Wireless Paradigm for Green Internet of Things: An Overview", IEEE Internet of Things Journal, vol. 1(1):81-98, Feb. 2014.

Daniels, R.C. et al., "Improving on Time-reversal with MISO Precoding," Proceedings of the Eighth International Symposium on Wireless Personal Communications Conference, Aalborg, Denmark, 5 pages, Sep. 18-22, 2005.

Daniels, R.C. et al., "MISO Precoding for Temporal and Spatial Focusing" in the Proceedings of the Eighth International Symposium on Wireless Personal Communications Conference, Aalborg, Denmark, 6 pages, Sep. 18-22, 2005.

De Rosny, J. et al., "Theory of Electromagnetic Time-Reversal Mirrors", IEEE Trans. Antennas Propag., vol. 58(10):3139-3149, Oct. 2010.

Derode, A. et al., "Ultrasonic pulse compression with one-bit time reversal through multiple scattering", J. Appl. Phys., vol. 85(9):6343-6352, May 1999.

Derode, A. et al., "Taking Advantage of Multiple Scattering to Communicate with Time-Reversal Antennas", Phys. Rev. Lett., vol. 90(1): 014301-1-4, Jan. 2003.

Derode, A. et al., "Robust Acoustic Time Reversal and High-Order Multiple Scattering", Phys. Rev. Lett., vol. 75(23):4206-4210, Dec. 1995.

Divsalar, D. and Simon, M. K., "Improved CDMA performance using parallel interference cancellation", JPL Publication, 95-21, Oct. 1995.

Divsalar, D., . Simon, M. K, Raphaeli, Dan, "Improved Parallel Interference Cancellation for CDMA", IEEE Transactions on Communications, vol. 46, No. 2, Feb. 1998.

Dorme, C. et al., "Focusing in transmit-receive mode through inhomogeneous media: The time reversal matched filter approach", J. Acoust. Soc. Am., vol. 98(2):1155-1162, Pt. 1, Aug. 1995.

Duel-Hallen, A., Holtzman, J., and Zvon,r, Z., "Multiuser detection for CDMA systems", IEEE Personal Communications, pp. 46-58, Apr. 1995.

Edelmann, G.F. et al., "An Initial Demonstration of Underwater Acoustic Communication Using Time Reversal", IEEE Journal of Oceanic Engineering, vol. 27(3):602-609, Jul. 2002.

Emami, M. et al., "Matched Filtering with Rate Back-off for Low Complexity Communications in Very Large Delay Spread Channels," 38th Asilomar Conference on Signals, Systems and Computers, pp. 218-222, 2004.

Emami, S.M. et al., "Predicted Time Reversal Performance in Wireless Communications using Channel Measurements", publication details unknown.

Fink, M. et al., "Acoustic Time-Reversal Mirrors", Inverse Problems, vol. 17:R1-R38, 2001.

Fink, M., "Time Reversal of Ultrasonic Fields-Part I: Basic Principals", IEEE Trans. Ultrasonics, Ferroelectrics and Freq. Contr., vol. 39(5):555-566, Sep. 1992.

Fink, M., "Time-Reversal Mirrors", J. Phys. D: Appl. Phys., vol. 26:1333-1350, 1993.

Fink, M., "Time-Reversed Acoustics", Scientific American, pp. 91-97, Nov. 1999.

Fink, M. et al., "Self focusing in inhomogeneous media with time reversal acoustic mirrors," IEEE Ultrasonics Symposium, vol. 1:681-686, 1989.

Fontana, R.J. et al., "Ultra-Wideband Precision Asset Location System", Proc. of the IEEE Conf. on UWB Sys. And Tech., pp. 147-150, 2002.

Guo, N. et al., "Reduced-Complexity UWB Time-Reversal Techniques and Experimental Results", IEEE Trans. On Wireless Comm., vol. 6(12):4221-4226, Dec. 2007.

Han, F. et al., "A multiuser TRDMA uplink system with 2D parallel interference cancellation," IEEE Transactions on Communications, vol. 62(3):1011-1022, Mar. 2014.

Han, F. et al., "An Interference Cancellation Scheme for the Multiuser TRDMA Uplink System," Global Telecommunications Conference, pp. 3583-3588, 2013.

Han, F., "Energy Efficient Optimization in Green Wireless Networks", University of Maryland Ph. D. Dissertation, 2013.

Han, F., et al., "Time-reversal division multiple access in multi-path channels," Global Telecommunications Conference, pp. 1-5, Dec. 2011.

(56) References Cited

OTHER PUBLICATIONS

Han, F. et al., "Time-reversal division multiple access over multipath channels," IEEE Transactions on Communications, vol. 60(7):1953-1965, Jul. 2012.

Han, Y. et al., "Time-Reversal with Limited Signature Precision: Tradeoff Between Complexity and Performance", Proc. IEEE Global Conference on Signal and Information Processing (GlobalSIP), Atlanta, Dec. 2014.

Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.

Jin, Y. et al., "Time-Reversal Detection Using Antenna Arrays", IEEE Trans. Signal Processing, vol. 57(4):1396-1414, Apr. 2009.

Jin, Y. et al., "Adaptive time reversal beamforming in dense multipath communication networks," 2008 42nd Asilomar Conference on Signals, Systems and Computers, pp. 2027-2031, Oct. 2008.

Khalegi, A. et al., "Demonstration of Time-Reversal in Indoor Ultra-Wideband Communication: Time Domain Measurement", IEEE Proc. of ISWCS, pp. 465-468, 2007.

Kuperman, W.A. et al., "Phase conjugation in the ocean: Experimental demonstration of an acoustic time-reversal mirror", J. Acoust. Soc. Am., vol. 103(1), pp. 25-40, Jan. 1998.

Kyritsi, P. et al., "One-bit Time Reversal for WLAN Applications", IEEE $16^{th}$ Intern. Symp. On Personal, Indoor and Mobile Radio Comm., pp. 532-536, 2005.

Kyritsi, P. et al., "Time reversal and zero-forcing equalization for fixed wireless access channels," 39th Asilomar Conference on Signals, Systems and Computers, pp. 1297-1301, 2005.

Kyritsi, P. et al., "Time reversal techniques for wireless communications," IEEE Vehicular Technology Conference, vol. 1:47-51, 2004.

Lemoult, F. et al., "Manipulating Spatiotemporal Degrees of Freedom in Waves of Random Media", Phys. Rev. Lett., vol. 103, 173902, Oct. 2009.

Lemoult, F. et al., "Resonant Metalenses for Breaking the Diffraction Barrier", Phys. Rev. Lett., vol. 104, 203901, May 2010.

Lerosey, G. et al., "Time Reversal of Electromagnetic Waves and Telecommunication", Radio Science, vol. 40, RS6S12, 2005.

Lerosey, G. et al., "Time Reversal of Electromagnetic Waves", Phys. Rev. Lett., vol. 92(19), 193904, May 2004.

Lerosey, G. et al., "Time Reversal of Wideband Microwaves", Appl. Phys. Lett., vol. 88, 154101, Apr. 2006.

Lerosey, G. et al., "Focusing beyond the diffraction limit with far-field time reversal", Science, vol. 315:1120-1122, Feb. 2007.

Lienard, M. et al., "Focusing gain model of time-reversed signals in dense multipath channels," IEEE Antennas and Wireless Propagation Letters, vol. 11:1064-1067, 2012.

Ma, H. et al., "Interference-Mitigating Broadband Secondary User Downlink System: A Time-Reversal Solution", Global Telecommunications Conference, pp. 884-889, 2013.

Molisch, Andreas F. et al., "IEEE 802.15.4a channel model—final report", Tech. Rep. Document IEEE 802.15-04-0662-02-004a, 2005.

Montaldo, G. et al., "Telecommunication in a disordered environment with iterative time reversal", Waves Random Media, vol. 14:287-302, 2004.

Moshavi, S., "Multi-user detection for DS-CDMA communications", IEEE Communications Magazine, pp. 124-136, Oct. 1996.

Moura, J.M.F. and Y. Jin, "Detection by Time Reversal: Single Antenna", IEEE Trans. On Signal Process., vol. 55(1):187-201, Jan. 2007.

Moura, J.M.F. and Y. Jin, "Time Reversal Imaging by Adaptive Interference Canceling", IEEE Trans. On Signal Process., vol. 56(1):233-247, Jan. 2008.

Naqvi, I.H., et al., "Performance Enhancement of Multiuser Time Reversal UWB Communication System", Proc. of IEEE ISWCS, pp. 567-571, 2007.

Naqvi, I.H. et al., "Experimental validation of time reversal ultra wide-band communication system for high data rates", IET Microw. Antennas Propag., vol. 4(Iss. 5):643-650, 2010.

Naqvi, I.H. et al., "Effects of Time Variant Channel on a Time Reversal UWB System", Global Telecommunications Conference, 2009.

Nguyen, H. T., "On the performance of one bit time reversal for multi-user wireless communications", IEEE Proc. of ISWCS, pp. 672-676, 2007.

Nguyen, H. et al., "Antenna Selection for Time Reversal MIMO UWB Systems", IEEE Vehicle Technology Conference, pp. 1-5, 2009.

Nguyen, H. et al. "On the MSI Mitigation for MIMO UWB Time Reversal Systems", Proc. of IEEE International Conference on Ultra-Wideband, pp. 295-299, 2009.

Nguyen, H. et al., "Preequalizer Design for Spatial Multiplexing SIMO-UWB TR Systems", IEEE Trans. On Vehicular Tech., vol. 59(8):3798-3805, Oct. 2010.

Nguyen, H.T., "Partial one bit time reversal for UWB impulse radio multi-user communications", IEEE Proc. of ICCE, 2008.

Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.

Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.

Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

Parvulescu, A. and Clay, C. S., "Reproducibility of Signal Transmissions in the Ocean", The Radio and Electronic Engineer, pp. 223-228, Apr. 1965.

Phan-Huy, D. T., S.B. Halima, M. Helard, "Frequency Division Duplex Time Reversal", Global Telecommunications Conference, (2011).

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal mirror: A solution to self-focusing in the pulse echo mode," J. Acoustic Society of America, vol. 90, pp. 1119-1129, 1991.

Qiu, R. C. et al., "Time reversal with miso for ultra-wideband communications: Experimental results," IEEE Antenna and Wireless Propagation Letters, vol. 5:269-273 (2006).

Rode, J. P., M.J. Hsu, D. Smith and A. Hussain, "Collaborative Beamfocusing Radio (COBRA)", Proc. of SPIE, vol. 8753, pp. 87530J-1-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

(56) References Cited

OTHER PUBLICATIONS

Varanasi, M. K. and Aazhang, B., "Multistage Detection in Asynchronous Code-Division Multiple-Access Communications", IEEE Transactions on Communications, vol. 38, No. 4, pp. 509-519, Apr. 1990.

Verdu, S., "Minimum probability of error for asynchronous Gaussian multiple-access channels", IEEE Trans. Inform. Theory, vol. IT-32, pp. 85-96, Jan. 1986.

Verdu, S., "Optimum multiuser asymptotic efficiency", IEEE Trans. Commun., vol. COM-34, pp. 890-897, Sep. 1986.

Viterbi, A. J., "Very low rate convolutional codes for maximum theoretical performance of spread-spectrum multiple-access channels", IEEE Transactions on Selected Areas in Communications, vol. 8, No. 4, pp. 641-649, May 1990.

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wang, B. et al., "Green wireless communications: A time-reversal paradigm," IEEE Journal of Selected Areas in Communications, vol. 29:1698-1710 (2011).

Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39(5):567-578, Sep. 1992.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Y.-H., Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

\* cited by examiner

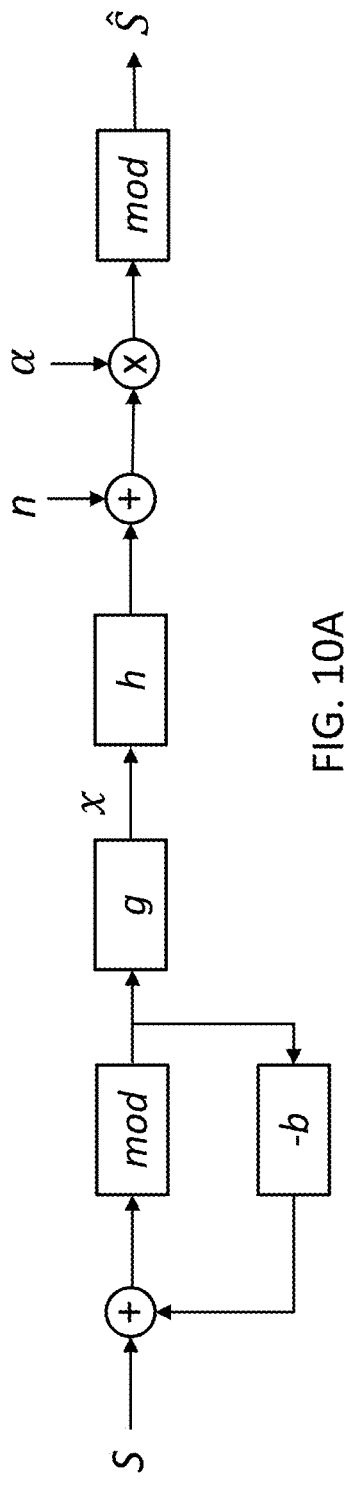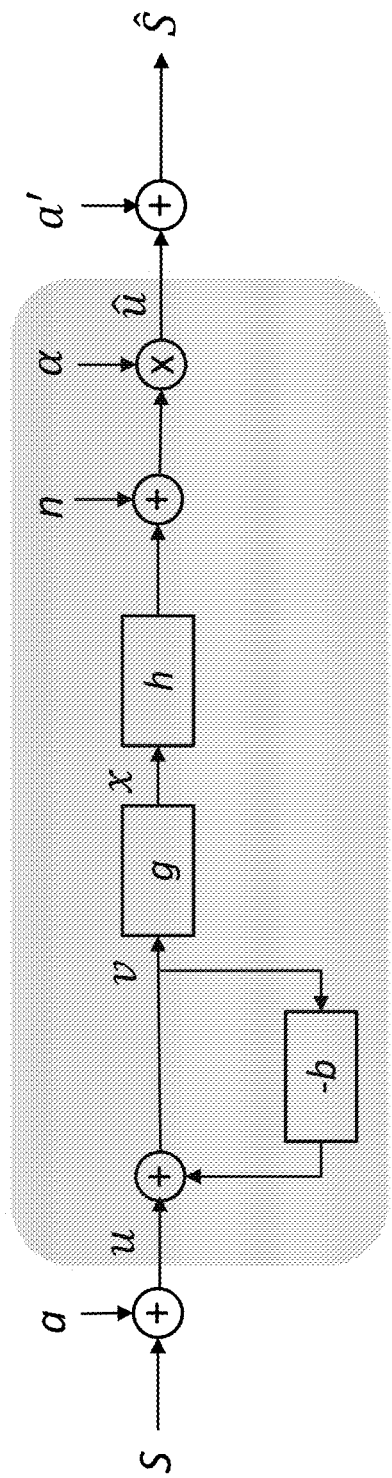

METHOD, APPARATUS, SERVER, AND SYSTEMS OF TIME-REVERSAL TECHNOLOGY

CROSS-REFERENCE TO RELATED APPLICATIONS

This patent application is a continuation-in-part of, and claims priority to, each of the following applications:
(a) U.S. patent application Ser. No. 13/706,342, titled "WAVEFORM DESIGN FOR TIME-REVERSAL SYSTEMS," filed on Dec. 5, 2012, now U.S. Pat. No. 9,883,511, issued on Jan. 30, 2018,
(b) U.S. patent application Ser. No. 13/969,271, titled "TIME-REVERSAL WIRELESS SYSTEM HAVING ASYMMETRIC ARCHITECTURE," filed on Aug. 16, 2013,
(c) U.S. patent application Ser. No. 13/969,320, titled "MULTIUSER TIME-REVERSAL DIVISION MULTIPLE ACCESS UPLINK SYSTEM WITH PARALLEL INTERFERENCE CANCELLATION," filed on Aug. 16, 2013, now U.S. Pat. No. 9,559,874, issued on Jan. 31, 2017,
(d) U.S. patent application Ser. No. 15/041,677, titled "HANDSHAKING PROTOCOL FOR TIME-REVERSAL SYSTEM," filed on Feb. 11, 2016, which claims priority to U.S. patent application Ser. No. 14/183,648, filed on Feb. 19, 2014, now issued as U.S. Pat. No. 9,313,020,
(e) U.S. patent application Ser. No. 15/200,430, titled "QUADRATURE AMPLITUDE MODULATION FOR TIME-REVERSAL SYSTEMS," filed on Jul. 1, 2016, which claims priority to U.S. patent application Ser. No. 14/262,153, filed on Apr. 25, 2014, now issued as U.S. Pat. No. 9,407,306,
(f) U.S. patent application Ser. No. 15/200,429, titled "TIME-REVERSAL WIRELESS PARADIGM FOR INTERNET OF THINGS," filed on Jul. 1, 2016, which claims priority to U.S. patent application Ser. No. 14/943,648, filed on Nov. 17, 2015, now issued as U.S. Pat. No. 9,402,245, which claims priority to U.S. patent application Ser. No. 14/202,651, filed on Mar. 10, 2014, now issued as U.S. Pat. No. 9,226,304,
(g) U.S. patent application Ser. No. 14/605,611, titled "WIRELESS POSITIONING SYSTEMS," filed on Jan. 26, 2015, which claims priority to U.S. provisional patent application 62/069,090, filed on Oct. 27, 2014, and U.S. provisional patent application 62/025,795, filed on Jul. 17, 2014, now U.S. Pat. No. 10,168,414 issued on Jan. 1, 2019,
(h) U.S. patent application Ser. No. 14/615,984, titled "JOINT WAVEFORM DESIGN AND INTERFERENCER PRE-CANCELLATION TIME-REVERSAL SYSTEMS," filed on Feb. 6, 2015,
(i) U.S. patent application Ser. No. 15/004,314, titled "TIME-REVERSAL TECHNOLOGIES FOR HYBRID WIRELESS NETWORKS," filed on Jan. 22, 2016, which claims priority to U.S. provisional patent application 62/106,395, filed on Jan. 22, 2015,
(j) U.S. patent application Ser. No. 15/061,059, titled "TIME-REVERSAL SCALABILITY FOR HIGH NETWORK DENSIFICATION," filed on Mar. 4, 2016, which claims priority to U.S. provisional patent application 62/128,574, filed on Mar. 5, 2015,
(k) PCT application PCT/US2015/041037, titled "WIRELESS POSITIONING SYSTEMS," filed on Jul. 17, 2015, which claims priority to U.S. provisional patent application 62/148,019, filed on Apr. 15, 2015,
(l) U.S. patent application Ser. No. 15/268,477, titled "HETEROGENEOUS TIME-REVERSAL PARADIGM ENABLING DIRECT CONNECTIVITY IN INTERNET OF THINGS," filed on Sep. 16, 2016, which claims priority to U.S. provisional patent application 62/219,315, filed on Sep. 16, 2015,
(m) U.S. patent application Ser. No. 15/284,496, titled "TIME REVERSAL COMMUNICATION SYSTEMS," filed on Oct. 3, 2016, which claims priority to U.S. provisional patent application 62/235,958, filed on Oct. 1, 2015, and
(n) PCT application PCT/US2016/066015, titled "METHOD, APPARATUS, AND SYSTEMS FOR WIRELESS EVENT DETECTION AND MONITORING," filed on Dec. 9, 2016, which claims priority to U.S. provisional patent application 62/265,155, filed on Dec. 9, 2015, U.S. provisional patent application 62/307,081, filed on Mar. 11, 2016, U.S. provisional patent application 62/316,850, filed on Apr. 1, 2016, U.S. provisional patent application 62/383,235, filed on Sep. 2, 2016, and U.S. provisional patent application 62/411,504, filed on Oct. 21, 2016.

The entire contents of all of the above applications (including (a) to (n) and the applications to which they claim priority) are herein incorporated by reference.

This patent application claims priority to each of the following applications:
(o) U.S. provisional patent application 62/331,278, titled "USING VIRTUAL ANTENNA FOR POWER WAVEFORMING IN WIRELESS POWER TRANSMISSION SYSTEMS," filed on May 3, 2016,
(p) U.S. provisional patent application 62/320,965, titled "OPTIMAL RATE ADAPTATION FOR THROUGHPUT MAXIMIZATION IN TIME REVERSAL DIVISION MULTIPLE ACCESS," filed on Apr. 11, 2016,
(q) U.S. provisional patent application 62/295,970, titled "THE IMPACT OF SPATIAL FOCUSING EFFECTS ON THE MEDIUM ACCESS CONTROL DESIGN FOR 5G," filed on Feb. 16, 2016,
(r) U.S. provisional patent application 62/316,850, titled "TR-BREATH TIME-REVERSAL BREATHING RATE ESTIMATION AND DETECTION," filed on Apr. 1, 2016,
(s) U.S. provisional patent application 62/307,081, titled "TR-BREATH TIME-REVERSAL BREATHING RATE ESTIMATION AND DETECTION," filed on Mar. 11, 2016,
(t) U.S. provisional patent application 62/307,172, titled "RADIO SHOT: THROUGH THE-WALL HUMAN IDENTIFICATION," filed on Mar. 11, 2016,
(u) U.S. provisional patent application 62/409,796, titled "METHODS, DEVICES, SERVERS, AND SYSTEMS OF TIME REVERSAL BASED TRACKING," filed on Oct. 18, 2016,
(v) U.S. provisional patent application 62/334,110, titled "TIME-REVERSAL TRACKING WITHOUT MAPPING," filed on May 10, 2016,
(w) U.S. provisional patent application 62/322,575, titled "TIME-REVERSAL RESONATING EFFECT AND ITS APPLICATION IN WALKING SPEED ESTIMATION," filed on Apr. 14, 2016,
(x) U.S. provisional patent application 62/383,235, titled "TIME REVERSAL MONITORING SYSTEM," filed on Sep. 2, 2016, (y) U.S. provisional patent application 62/384,060, titled "METHODS, DEVICES, SERVERS, SYSTEMS OF TIME REVERSAL MACHINE PLATFORM FOR BROADBAND WIRELESS APPLICATIONS," filed on Sep. 6, 2016, and (z) U.S. provisional patent application 62/411,504, titled "METHOD, APPARATUS, AND SYSTEM FOR WIRELESS INTERNET OF THINGS APPLICATIONS," filed on Oct. 21, 2016.

The entire contents of all of the above applications (including (o) to (z)) are herein incorporated by reference.

TECHNICAL FIELD

This disclosure relates to collecting and processing location-specific wireless waveforms for use in wireless communication, components, methods, apparatuses, servers, and systems.

BACKGROUND

One challenge that may be addressed in the future using novel wireless signaling protocols is high-speed and efficient wireless data transfer to and from huge numbers of potentially closely spaced devices. The demand for high-speed and low-latency wireless communication capabilities has increased dramatically in recent years. It has been projected that by the year 2020, the volume of wireless traffic will rise to about one thousand times that of the year 2010. Supporting these traffic demands will be a challenge for future wireless networks. One challenge will be supporting the huge number of wireless devices with ever-growing demands for higher data rates within the allocated spectrum. Another will be the scheduling delay that is expected to accompany large numbers of coexisting wireless devices competing for network service and the significant deterioration of the user experience in many delay-sensitive applications. Some network users have already started to feel the impact of such delays in places such as airports, conference halls, and stadiums where it is difficult to access the wireless network with hundreds of other devices around. Such poor user experiences may become the norm if new technologies are not introduced to deal with the predicted growth of wireless traffic.

Several technologies have been proposed to tackle this challenge. One straightforward approach is to install more access points (APs) in a given coverage area such that each AP can service a smaller number of terminal devices (TDs) and therefore more traffic can be offloaded to the wired backhaul networks. However, APs that utilize the widely adopted and deployed OFDM protocols can interfere with each other when they are deployed too close together. Sophisticated interference mitigation and resource allocation algorithms may be used to enable the closely spaced APs to accommodate multiple users. For instance, in the IEEE 802.11 (WiFi) standard, the overall available spectrum is 72 MHz in the 2.4 GHz band but adjacent APs may be restricted to utilizing 22 MHz or less of the available spectrum because they may each need to operate in different spectral bands to reduce interference with each other and with the TDs. But this kind of frequency division multiplexing may hinder closely-spaced APs from fully utilizing the available spectrum and therefore supporting the predicted user demands of the future. Moreover, in such schemes, channel planning can be time-consuming and may fail altogether, either because of a lack of communication among multiple APs, or a lack of enough independent spectral bands to support the traffic demands. The system may suffer when APs are added or removed from the network because the channel planning may need to be done all over again. Femtocell networks or device-to-device (D2D) communication networks may suffer from similar issues since the interference between macro- and/or femto-base stations or among multiple femto-base stations or among multiple D2D links need to be coordinated and mitigated by division of the network resources, which may result in reducing the spectral allocation to individual users or cells. Therefore, while installing more OFDM (or similar existing protocol) based access points in a given wireless coverage area may be straightforward and a suitable solution for some applications, this solution alone does not appear to scale well enough to meet the predicted growth in traffic demands of future wireless network capabilities.

Another possible approach is to use multiple-input-multiple-output (MIMO) techniques such as have been incorporated in some existing OFDM based schemes such as WiFi and LTE (Long Term Evolution) to improve the spectral efficiency and/or reduce the scheduling delay of wireless networks. For example, multi-user multiple-input-multiple-output (MU-MIMO) techniques are able to support multiple simultaneous transmissions. However, in addition to the difficulty in operating multiple antennas, the number of supported simultaneous transmissions may be limited. Therefore, this solution alone may not be sufficient for the high network densification challenge described above. Recently, researchers have begun to investigate so-called massive MIMO techniques that use many more antennas than active terminals so that the extra antennas can help focus the wireless signal energy into smaller regions and support some level of spatial multiplexing in addition to frequency multiplexing. While the massive MIMO technique brings some unique benefits beyond the traditional MIMO system, the cost and complexity of implementing these schemes scales up with the number of antennas, which may hinder it from being widely adopted. The principle of utilizing extra antennas can also be applied in distributed antenna systems where some additional antennas are placed close to the users. The wireless signal energy can be focused into a small area through the coordination of the local antennas and thus the system may be able to provide high data rates for certain terminal devices. However, the complexity of the system and of coordinating the antennas grows with the system size, which may limit the scalability of this solution. Therefore, there is a need for wireless communication technologies that can efficiently and cost-effectively meet the ever increasing demands for wireless access to the internet.

Another candidate solution is the cloud-based radio access networks (C-RAN), where all baseband processing is carried out through high performance computing in a centralized structure, which transforms the evolution of the wireless networks from today's cell-centric architecture into a device-centric architecture. Nevertheless, as with networks densification, the limited front-haul link capacity may prevent the C-RAN from fully utilizing the benefits made possible by concentrating the processing intelligence at the cloud.

Moreover, the operation of a large number of base stations and heterogeneous devices will consume a lot of energy. Therefore, the next generation networks should focus on achieving better energy efficiency and reduce the complexity of user devices as much as possible.

SUMMARY

In one embodiment, a time-reversal system comprises a first wireless transceiver of a time-reversal client, one or more second wireless transceiver and/or a time-reversal client with the first wireless transceiver. The first wireless transceiver of the time-reversal client is wirelessly coupled to the one or more second wireless transceiver through a wireless broadband multipath channel associated with a space. The time-reversal client contains the first wireless transceiver. The time-reversal client also contains a processor and a memory configured to obtain a set of channel state information (CSI) in a channel probing phase, and/or to obtain a set of location-specific signatures based on the set of CSI and/or a time reversal operation in a channel probing phase. The set of CSI is captured when one or more probing signal is sent either from the first wireless transceiver to each of the at least one second wireless transceiver, or from each of the at least one second wireless transceiver to the first wireless transceiver, through the wireless broadband multipath channel associated with the space. A channel passband with bandwidth W0 is associated with the wireless broadband multipath channel. A first passband with bandwidth W1 is associated with the first wireless transceiver. The W1 is not larger than W0 such that the first passband is part of the channel passband. One or more second passband is associated with the one or more second wireless transceiver such that a bandwidth W2 associated with each of the one or more second passband is not larger than W1 such that the each of the one or more second passband is part of the first passband. Each of the set of CSI include a channel impulse response, a channel frequency response, and/or another channel state data of the wireless broadband multipath channel.

In a data transmission phase, the time-reversal client may use the processor and the memory to determine that one or more information sequence is intended to be transmitted each to respective second wireless transceiver. The time-reversal client may up-sample the one or more information sequence, each based on respective second passband with bandwidth W2 associated with respective second wireless transceiver and/or the first passband with bandwidth W1. The time-reversal client may generate one or more downlink signal each based on respective up-sampled information sequence and/or respective location-specific signature associated with respective second wireless transceiver. The time-reversal client may obtain a combined downlink signal associated with the first passband with bandwidth W1 by adding the at least one downlink signal. The time-reversal client may generate a combined radio frequency (RF) signal with passband being the first passband with bandwidth W1 based on the combined downlink signal. The time-reversal client may transmit the combined RF signal from the first wireless transceiver to the one or more second wireless transceiver through the wireless broadband multipath channel associated with the space such that respective downlink signals focus at respective second wireless transceivers. A particular second wireless transceiver with a particular second passband with bandwidth W2, in the data transmission phase, may receive a received signal which is the combined downlink signal bandlimited to the particular second passband with bandwidth W2. The particular second wireless transceiver may gain-adjust the received signal. The particular second wireless transceiver may down-sample the gain-adjusted received signal based on the particular second passband with bandwidth W2 to extract information sequence intended for the particular second wireless transceiver.

In the data transmission phase, the time-reversal client may generate the one or more downlink signal, with each based on the respective up-sampled information sequence and/or respective downlink waveform associated with respective second wireless transceiver. The downlink waveform may be chosen to maximize a weighted sum of downlink data rate associated with all of the one or more second wireless transceiver. The respective downlink waveform may be chosen based on the set of CSI, the time reversal operation on the set of CSI, and/or an iterative optimization of downlink waveforms and/or downlink power allocation for all downlinks to the at least one second wireless transceiver under total power constraint of the first wireless transceiver.

In the data transmission phase, one or more second wireless transceiver may each send an uplink information sequence wirelessly to the first wireless transceiver through the wireless broadband multipath channel associated with the space simultaneously. The time-reversal client may obtain a received combined signal containing the one or more uplink information sequence from the one or more second wireless transceiver. The time-reversal client may determine each respective uplink information sequence from respective second wireless transceiver based on a convolution of the received combined signal and the respective set of location-specific signature associated with the respective second wireless transceiver.

In the data transmission phase, two second wireless transceivers may each send an information sequence wirelessly to the first wireless transceiver through the wireless broadband multipath channel associated with the space simultaneously. The time-reversal client may, in the data transmission phase, obtain a received combined signal containing the two information sequences from the two second wireless transceivers. The time-reversal client may determine two initial estimated information sequences each associated with respective second wireless transceiver. The determination may be based on a convolution of the received signal and the respective set of location-specific signature associated with the respective second wireless transceiver. The time-reversal client may determine interference based on at least one of the two initial estimated information sequences. The time-reversal client may determine a refined estimated information sequence associated with a particular one of the two second wireless transceivers by canceling the interference from the information sequence of the particular second wireless transceiver.

A particular second wireless transceiver may send a particular probing signal to the first wireless transceiver through the wireless broadband multipath channel associated with the space. The particular probing signal may contain two parts: a preamble and a training sequence, both known to the first wireless transceiver and the particular second wireless transceiver. In the channel probing phase, the first wireless transceiver may receive the particular probing signal. The first wireless transceiver may synchronize with the particular probing signal by determining a synchronization index based on the preamble of the particular probing signal. The first wireless transceiver may identify the training sequence of the particular probing signal based on the synchronization index and the known preamble. The first wireless transceiver may determine a particular CSI. The first wireless transceiver may generate a particular location-specific signature waveform for the particular second wireless transceiver based on time reversing the particular CSI. In a data transmission phase, the first wireless transceiver may generate a transmission signal based on an information sequence and the particular location-specific signature waveform.

In the data transmission phase, the time-reversal client may generate the one or more downlink signal based on quadrature amplitude modulation (QAM).

A third wireless transceiver of another time-reversal client may be wirelessly coupled with the particular second wireless transceiver and/or another wireless transceiver, through another wireless broadband multipath channel associated with another space in a vicinity of the space. A third passband with bandwidth W3 may be associated with the third wireless transceiver. In the data transmission phase, the third wireless transceiver of the another time-reversal client may transmit another RF signal with passband being the third passband with bandwidth W3 to the particular second wireless transceiver and/or another wireless transceiver, through the another wireless broadband multipath channel associated with the another space in the vicinity of the space. The third passband with bandwidth W3 may overlap the first passband of the first wireless transceiver at an overlap band such that the first wireless transceiver and the third wireless transceiver may transmit in the same overlap band simultaneously.

The W3 may be equal to W1 and the third passband of the third wireless transceiver may be identical to the first passband of the first wireless transceiver such that the first wireless transceiver and the third wireless transceiver may transmit in the same passband simultaneously.

One or more third wireless transceiver wirelessly may be coupled with the first wireless transceiver of the time-reversal client through the wireless broadband multipath channel associated with the space. All of the one or more second wireless transceivers and/or all of the at least one third wireless transceivers may have the same passband with bandwidth W2. Each location-specific signature may be associated with a CSI. The channel probing phase may be a training phase of a positioning task to capture the set of location-specific signature associated with a set of locations. An instantaneous location of each of the one or more third wireless transceiver may be determined in an operating phase of the positioning task based on an instantaneous set of CSI and/or the location-specific signatures obtained in the training phase of the positioning task each associated a location in the space. In the training phase, the at least one second wireless transceiver with identical passband with bandwidth W2 may be moved to different locations in the space to capture, for each location, at least one CSI and at least one corresponding location-specific signature. In the operating phase, each of the one or more third wireless transceiver is moved along a path in the space. In the operating phase, the time-reversal client may be further configured to obtain the instantaneous set of CSI captured when one or more probing signal is sent from the first wireless transceiver and/or each of the at least one third wireless transceiver at a location of the path, to the each of the at least one third wireless transceiver at the location of the path and/or the first wireless transceiver, through the wireless broadband multipath channel associated with the space. The time-reversal client may compare the instantaneous set of CSI with the set of location-specific signatures using a similarity metric to identify the location of the path as a location associated with a matching location-specific signature.

In the data transmission phase, the time-reversal client may determine using the processor and the memory that at least one sequence of data symbols is intended to be transmitted to the at least one respective second wireless transceiver. The time-reversal client may estimate inter-symbol interference (ISI) experienced by the one or more second wireless transceiver when the one or more sequence of data symbols are received by the one or more second wireless transceiver. The time-reversal client may modify the at least one sequence of data symbols based on respective channel information and/or the estimated ISI to reduce the ISI experienced by the one or more second wireless transceiver. The time-reversal client may generate one or more downlink signal based on the one or more sequence of modified data symbols and one or more respective signature waveform. The time-reversal client may generate a combined RF signal based on the one or more downlink signal. The time-reversal client may transmit the combined RF signal from the first wireless transceiver to the one or more second wireless transceiver through the wireless broadband multipath channel associated with the space such that respective downlink signals may focus at respective second wireless transceivers.

The time-reversal system may include a controller to control an operation of the time-reversal client. The time-reversal client may support a time-reversal division multi-access protocol and/or at least one other wireless communication protocol.

There may be one or more second wireless transceivers. The one or more second wireless transceivers may be heterogeneous such that the CSI associated with the one or more heterogeneous second wireless transceivers may be heterogeneous and/or the location-specific signatures may be heterogeneous. The time-reversal client may further include an analog-to-digital convertor circuit with a sampling frequency determined based on the channel passband bandwidth W0. In the data transmission phase, the time-reversal client may be configured to receive using the first wireless transceiver a combined RF signal comprising two or more heterogeneous RF signals from the two or more second heterogeneous wireless transceivers. The time-reversal client may determine a sequences of heterogeneous data symbols associated with each of the one or more second heterogeneous wireless transceivers. The determination may be based on the received combined RF signal, the heterogeneous location-specific signatures, a heterogeneous second wireless transceiver bandwidth, and a heterogeneous second wireless transceiver center frequency.

In the data transmission phase, the time-reversal client may be configured to receive a first signal transmitted from a particular second wireless transceiver to the first wireless transceiver through the wireless broadband multipath channel associated with the space. The first signal may comprise a preamble and a data frame. The preamble may include a known code sequence. The data frame may include a plurality of data symbols. The time-reversal client may compute a second signal that represents an estimated equivalent channel response using the received first signal and the known code sequence. The time-reversal client may downsampled the second signal. The time-reversal client may compute a signal-to-interference-plus-noise ratio at a plurality of timing offsets. The time-reversal client may determine the symbol timing based on the timing offset associated with the largest computed signal-to-interference-plus-noise ratio. The time-reversal client may determine the data symbols in the data frame based on the determined symbol timing.

In the data transmission phase, a particular second wireless transceiver may receive a first signal transmitted from the first wireless transceiver to the particular second wireless transceiver through the wireless broadband multipath channel associated with the space. The first signal may comprise a preamble and a data frame. The preamble may include a known code sequence and the data frame may include a plurality of data symbols. The time-reversal client may compute a second signal that represents an estimated equivalent channel response using the received first signal and/or the known code sequence. The time-reversal client may down-sampled the second signal. The time-reversal client may compute a signal-to-interference-plus-noise ratio at a plurality of timing offsets. The time-reversal client may determine the symbol timing based on the timing offset associated with the largest computed signal-to-interference-plus-noise ratio. The time-reversal client may determine the data symbols in the data frame based on the determined symbol timing.

In another embodiment, a time-reversal system comprises M second wireless transceivers each at a different second location and each with $N_m$ number of passbands, $m=1, \ldots, M$, each passband having a bandwidth and a center frequency, and K first wireless transceivers of a time-reversal client each at a different first location and each configured to receive at least one of the passbands of bandwidth $b_{m,n,k}$ of the M second wireless transceivers, $m=1, \ldots, M, n=1, \ldots, N, k=1, \ldots, K$, with K,M and $N_m$ being integers greater than zero. Each of the M second wireless transceivers is wirelessly coupled with each of the K first wireless transceiver through a wireless broadband multipath channel associated with a space. The time-reversal client with the K first wireless transceiver, includes a processor and a memory. The time-reversal client is configured to receive signals from the at least one of the passbands of the M second wireless transceivers. The time-reversal client is configured to compare information derived from the received signals from the at least one of the passbands of the M second wireless transceivers received by the K first wireless transceivers with. The time-reversal client is configured to determine information about an arrangement of macroscopic objects in the space based on the comparison. The time-reversal client is configured to generate an output based on the determined information. The system has a collective bandwidth B greater than 50 MHz, wherein $B=\Sigma_{m=1}^{M}\Sigma_{m=1}^{N_m}\Sigma_{k=1}^{K_b} b_{m,n,k}$, and wherein the derived information that is compared to the information in the database spans the collective bandwidth.

BRIEF DESCRIPTION OF DRAWINGS

FIGS. 10A and 10B are diagrams of joint waveform design and interference pre-cancellation for an exemplary single-user time-reversal system.

DETAILED DESCRIPTION

Figure 1:
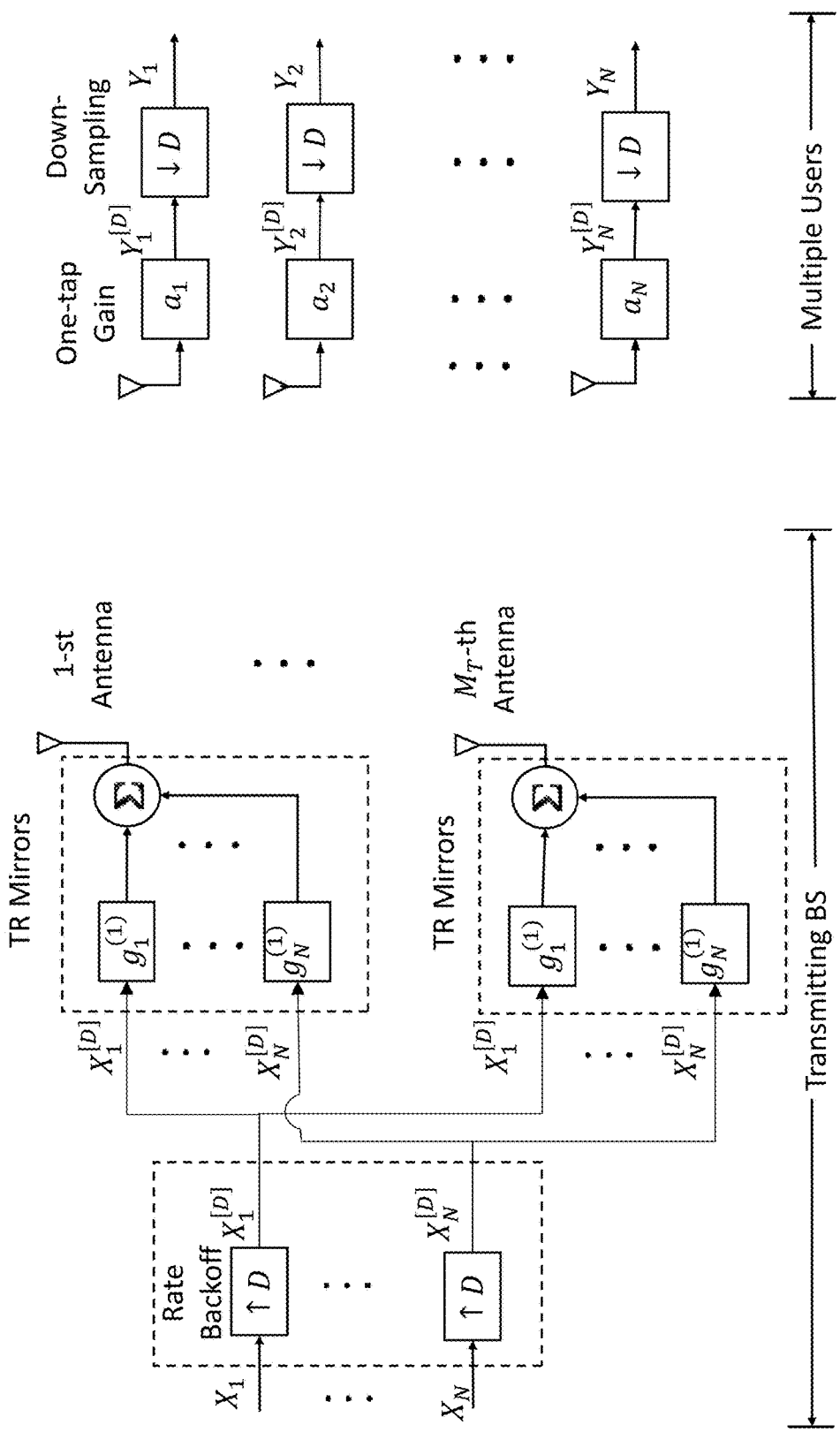
FIG. 1 is a block diagram of a multiple-input single-output (MISO) Time Reversal Division Multiple Access (TRDMA) downlink system according to an exemplary embodiment.

In one embodiment, a time-reversal system comprises a first wireless transceiver of a time-reversal client, one or more second wireless transceiver and/or a time-reversal client with the first wireless transceiver. The first wireless transceiver of the time-reversal client is wirelessly coupled to the one or more second wireless transceiver through a wireless broadband multipath channel associated with a space. The time-reversal client contains the first wireless transceiver. The time-reversal client also contains a processor and a memory configured to obtain a set of channel state information (CSI) in a channel probing phase, and/or to obtain a set of location-specific signatures based on the set of CSI and/or a time reversal operation in a channel probing phase. The set of CSI is captured when one or more probing signal is sent either from the first wireless transceiver to each of the at least one second wireless transceiver, or from each of the at least one second wireless transceiver to the first wireless transceiver, through the wireless broadband multipath channel associated with the space. A channel passband with bandwidth W0 is associated with the wireless broadband multipath channel. A first passband with bandwidth W1 is associated with the first wireless transceiver. The W1 is not larger than W0 such that the first passband is part of the channel passband. One or more second passband is associated with the one or more second wireless transceiver such that a bandwidth W2 associated with each of the one or more second passband is not larger than W1 such that the each of the one or more second passband is part of the first passband. Each of the set of CSI include a channel impulse response, a channel frequency response, and/or another channel state data of the wireless broadband multipath channel.

In a data transmission phase, the time-reversal client may use the processor and the memory to determine that one or more information sequence is intended to be transmitted each to respective second wireless transceiver. The time-reversal client may up-sample the one or more information sequence, each based on respective second passband with bandwidth W2 associated with respective second wireless transceiver and/or the first passband with bandwidth W1. The time-reversal client may generate one or more downlink signal each based on respective up-sampled information sequence and/or respective location-specific signature associated with respective second wireless transceiver. The time-reversal client may obtain a combined downlink signal associated with the first passband with bandwidth W1 by adding the at least one downlink signal. The time-reversal client may generate a combined radio frequency (RF) signal with passband being the first passband with bandwidth W1 based on the combined downlink signal. The time-reversal client may transmit the combined RF signal from the first wireless transceiver to the one or more second wireless transceiver through the wireless broadband multipath channel associated with the space such that respective downlink signals focus at respective second wireless transceivers. A particular second wireless transceiver with a particular second passband with bandwidth W2, in the data transmission phase, may receive a received signal which is the combined downlink signal bandlimited to the particular second passband with bandwidth W2. The particular second wireless transceiver may gain-adjust the received signal. The particular second wireless transceiver may down-sample the gain-adjusted received signal based on the particular second passband with bandwidth W2 to extract information sequence intended for the particular second wireless transceiver.

In the data transmission phase, the time-reversal client may generate the one or more downlink signal, with each based on the respective up-sampled information sequence and/or respective downlink waveform associated with respective second wireless transceiver. The downlink waveform may be chosen to maximize a weighted sum of downlink data rate associated with all of the one or more second wireless transceiver. The respective downlink waveform may be chosen based on the set of CSI, the time reversal operation on the set of CSI, and/or an iterative optimization of downlink waveforms and/or downlink power allocation for all downlinks to the at least one second wireless transceiver under total power constraint of the first wireless transceiver.

In the data transmission phase, one or more second wireless transceiver may each send an uplink information sequence wirelessly to the first wireless transceiver through the wireless broadband multipath channel associated with the space simultaneously. The time-reversal client may obtain a received combined signal containing the one or more uplink information sequence from the one or more second wireless transceiver. The time-reversal client may determine each respective uplink information sequence from respective second wireless transceiver based on a convolution of the received combined signal and the respective set of location-specific signature associated with the respective second wireless transceiver.

In the data transmission phase, two second wireless transceivers may each send an information sequence wirelessly to the first wireless transceiver through the wireless broadband multipath channel associated with the space simultaneously. The time-reversal client may, in the data transmission phase, obtain a received combined signal containing the two information sequences from the two second wireless transceivers. The time-reversal client may determine two initial estimated information sequences each associated with respective second wireless transceiver. The determination may be based on a convolution of the received signal and the respective set of location-specific signature associated with the respective second wireless transceiver. The time-reversal client may determine interference based on at least one of the two initial estimated information sequences. The time-reversal client may determine a refined estimated information sequence associated with a particular one of the two second wireless transceivers by canceling the interference from the information sequence of the particular second wireless transceiver.

A particular second wireless transceiver may send a particular probing signal to the first wireless transceiver through the wireless broadband multipath channel associated with the space. The particular probing signal may contain two parts: a preamble and a training sequence, both known to the first wireless transceiver and the particular second wireless transceiver. In the channel probing phase, the first wireless transceiver may receive the particular probing signal. The first wireless transceiver may synchronize with the particular probing signal by determining a synchronization index based on the preamble of the particular probing signal. The first wireless transceiver may identify the training sequence of the particular probing signal based on the synchronization index and the known preamble. The first wireless transceiver may determine a particular CSI. The first wireless transceiver may generate a particular location-specific signature waveform for the particular second wireless transceiver based on time reversing the particular CSI. In a data transmission phase, the first wireless transceiver may generate a transmission signal based on an information sequence and the particular location-specific signature waveform.

In the data transmission phase, the time-reversal client may generate the one or more downlink signal based on quadrature amplitude modulation (QAM).

A third wireless transceiver of another time-reversal client may be wirelessly coupled with the particular second wireless transceiver and/or another wireless transceiver, through another wireless broadband multipath channel associated with another space in a vicinity of the space. A third passband with bandwidth W3 may be associated with the third wireless transceiver. In the data transmission phase, the third wireless transceiver of the another time-reversal client may transmit another RF signal with passband being the third passband with bandwidth W3 to the particular second wireless transceiver and/or another wireless transceiver, through the another wireless broadband multipath channel associated with the another space in the vicinity of the space. The third passband with bandwidth W3 may overlap the first passband of the first wireless transceiver at an overlap band such that the first wireless transceiver and the third wireless transceiver may transmit in the same overlap band simultaneously.

The W3 may be equal to W1 and the third passband of the third wireless transceiver may be identical to the first passband of the first wireless transceiver such that the first wireless transceiver and the third wireless transceiver may transmit in the same passband simultaneously.

One or more third wireless transceiver wirelessly may be coupled with the first wireless transceiver of the time-reversal client through the wireless broadband multipath channel associated with the space. All of the one or more second wireless transceivers and/or all of the at least one third wireless transceivers may have the same passband with bandwidth W2. Each location-specific signature may be associated with a CSI. The channel probing phase may be a training phase of a positioning task to capture the set of location-specific signature associated with a set of locations. An instantaneous location of each of the one or more third wireless transceiver may be determined in an operating phase of the positioning task based on an instantaneous set of CSI and/or the location-specific signatures obtained in the training phase of the positioning task each associated a location in the space. In the training phase, the at least one second wireless transceiver with identical passband with bandwidth W2 may be moved to different locations in the space to capture, for each location, at least one CSI and at least one corresponding location-specific signature. In the operating phase, each of the one or more third wireless transceiver is moved along a path in the space. In the operating phase, the time-reversal client may be further configured to obtain the instantaneous set of CSI captured when one or more probing signal is sent from the first wireless transceiver and/or each of the at least one third wireless transceiver at a location of the path, to the each of the at least one third wireless transceiver at the location of the path and/or the first wireless transceiver, through the wireless broadband multipath channel associated with the space. The time-reversal client may compare the instantaneous set of CSI with the set of location-specific signatures using a similarity metric to identify the location of the path as a location associated with a matching location-specific signature.

In the data transmission phase, the time-reversal client may determine using the processor and the memory that at least one sequence of data symbols is intended to be transmitted to the at least one respective second wireless transceiver. The time-reversal client may estimate inter-symbol interference (ISI) experienced by the one or more second wireless transceiver when the one or more sequence of data symbols are received by the one or more second wireless transceiver. The time-reversal client may modify the at least one sequence of data symbols based on respective channel information and/or the estimated ISI to reduce the ISI experienced by the one or more second wireless transceiver. The time-reversal client may generate one or more downlink signal based on the one or more sequence of modified data symbols and one or more respective signature waveform. The time-reversal client may generate a combined RF signal based on the one or more downlink signal. The time-reversal client may transmit the combined RF signal from the first wireless transceiver to the one or more second wireless transceiver through the wireless broadband multipath channel associated with the space such that respective downlink signals may focus at respective second wireless transceivers.

The time-reversal system may include a controller to control an operation of the time-reversal client. The time-reversal client may support a time-reversal division multi-access protocol and/or at least one other wireless communication protocol.

There may be one or more second wireless transceivers. The one or more second wireless transceivers may be heterogeneous such that the CSI associated with the one or more heterogeneous second wireless transceivers may be heterogeneous and/or the location-specific signatures may be heterogeneous. The time-reversal client may further include an analog-to-digital convertor circuit with a sampling frequency determined based on the channel passband bandwidth W0. In the data transmission phase, the time-reversal client may be configured to receive using the first wireless transceiver a combined RF signal comprising two or more heterogeneous RF signals from the two or more second heterogeneous wireless transceivers. The time-reversal client may determine a sequences of heterogeneous data symbols associated with each of the one or more second heterogeneous wireless transceivers. The determination may be based on the received combined RF signal, the heterogeneous location-specific signatures, a heterogeneous second wireless transceiver bandwidth, and a heterogeneous second wireless transceiver center frequency.

In the data transmission phase, the time-reversal client may be configured to receive a first signal transmitted from a particular second wireless transceiver to the first wireless transceiver through the wireless broadband multipath channel associated with the space. The first signal may comprise a preamble and a data frame. The preamble may include a known code sequence. The data frame may include a plurality of data symbols. The time-reversal client may compute a second signal that represents an estimated equivalent channel response using the received first signal and the known code sequence. The time-reversal client may down-sampled the second signal. The time-reversal client may compute a signal-to-interference-plus-noise ratio at a plurality of timing offsets. The time-reversal client may determine the symbol timing based on the timing offset associated with the largest computed signal-to-interference-plus-noise ratio. The time-reversal client may determine the data symbols in the data frame based on the determined symbol timing.

In the data transmission phase, a particular second wireless transceiver may receive a first signal transmitted from the first wireless transceiver to the particular second wireless transceiver through the wireless broadband multipath channel associated with the space. The first signal may comprise a preamble and a data frame. The preamble may include a known code sequence and the data frame may include a plurality of data symbols. The time-reversal client may compute a second signal that represents an estimated equivalent channel response using the received first signal and/or the known code sequence. The time-reversal client may down-sampled the second signal. The time-reversal client may compute a signal-to-interference-plus-noise ratio at a plurality of timing offsets. The time-reversal client may determine the symbol timing based on the timing offset associated with the largest computed signal-to-interference-plus-noise ratio. The time-reversal client may determine the data symbols in the data frame based on the determined symbol timing.

In another embodiment, a time-reversal system comprises M second wireless transceivers each at a different second location and each with $N_m$ number of passbands, $m=1, \ldots, M$, each passband having a bandwidth and a center frequency, and K first wireless transceivers of a time-reversal client each at a different first location and each configured to receive at least one of the passbands of bandwidth $b_{m,n,k}$ of the M second wireless transceivers, $m=1, \ldots, M$, $n=1, \ldots, N$, $k=1, \ldots, K$, with K,M and $N_m$ being integers greater than zero. Each of the M second wireless transceivers is wirelessly coupled with each of the K first wireless transceiver through a wireless broadband multipath channel associated with a space. The time-reversal client with the K first wireless transceiver, includes a processor and a memory. The time-reversal client is configured to receive signals from the at least one of the passbands of the M second wireless transceivers. The time-reversal client is configured to compare information derived from the received signals from the at least one of the passbands of the M second wireless transceivers received by the K first wireless transceivers with. The time-reversal client is configured to determine information about an arrangement of macroscopic objects in the space based on the comparison. The time-reversal client is configured to generate an output based on the determined information. The system has a collective bandwidth B greater than 50 MHz, wherein $B=\Sigma_{m=1}^{M} \Sigma_{n=1}^{N_m} \Sigma_{k=1}^{K_b} b_{m,n,k}$, and wherein the derived information that is compared to the information in the database spans the collective bandwidth.

In one embodiment, the time-reversal (TR) system may be used to monitor the space. In the monitoring phase, the TR system may continuously sense the environment (with the bot, e.g. second wireless transceiver, continuously sending a series of probing signals to the origin, e.g. first wireless transceiver so that the origin can capture CSI continuously in real time) and collect CSI.

During the monitoring phase, the TR system may determine among multiple alert states, such as normal state (e.g. "all doors close", "safe", "no activity", etc), other targeted alert states (e.g. "front door open", "front door close", "front door half open", "back door open", "back screen door half open", "front window open", "human activity detected", "motion detected", etc), and default alert states (e.g. "abnormal but unknown", "something abnormal", "some activity").

In a training phase (basically a channel probing phase), reference models/statistics/parameters (e.g. of CSI, some behavior/dynamics/features of CSI) associated with each alert state are collected and stored. In the training phase, the user may put the environment into various alert states (e.g. by opening the front door to certain extent, moving the back door, opening the window, etc) and signal the TR system to capture the CSI associated with the alert state. Supervised training. The training may be also be manual, semi-automatic or automatic. Inputs from other security/monitoring system (e.g. vision based, motion-sensor based, infra-red sensor based, ultra-sound based, touch sensor based, laser based, etc.) may be used to guide the training. Some past training may be used. The training may be query based with the system capturing CSI actively and asking simple questions to the user as to which alert state the TR system is in. The reference models/statistics/parameters may be used in the monitoring phase to determine among the multiple alert states.

However, the reference models/statistics/parameters may become less accurate/precise/relevant over time as the environment (in the space) change over time. As a result, the reference models/statistics/parameters may be updated over time. The update may be automatic (without user input), semi-automatic (with partial user input), and/or manual (with full user input similar to the initial training in the training phase.

The update may include collecting CSI in a particular alert state (e.g. the normal state, the "all doors close" state, etc) and analyzing its temporal trend. A first-in-first-out (FIFO) buffer may be used to store N number of CSI in the immediate past. The stored CSI may be consecutive CSI over time. The stored CSI may be consecutive significant CSI (which may not be consecutive over time). When the buffer is full, the newest CSI may replace the oldest CSI in a FIFO manner. The reference models/statistics/parameters associated with the current alert state (i.e. the particular alert state, e.g. "all doors close" state) may be updated periodically. The reference models/statistics/parameters associated with the current alert state may also be updated whenever a significant (e.g. big enough) change in CSI behavior is detected. The update may use the CSI in the FIFO buffer as some of the training data. The update may use past statistics/trends in the recent past, distant past, etc.

Here is an example of "significant change in CSI behavior". The instantaneous information of the CSI in the FIFO (e.g. the newest CSI, an average of two or more CSI, a statistics of some of the CSI, etc) may be compared with some old CSI (e.g. some reference/typical/representative CSI used in the training of the current reference models/statistics/parameters). Some similarity measure (e.g. Time-reversal resonance strength, TRRS, MSE, MAE, etc) may be computed. If the similarity measure satisfies a certain condition (e.g. TRRS smaller than a threshold), it may be considered "unusual" and may constitute a "significant change in CSI behavior" and may trigger or cause to trigger an update. To prevent false alarm due to noise, multiple consecutive "unusual" behavior may be need to constitute a "significant change in CSI behavior". Majority voting may be applied over a sliding window. Multiple level of majority voting may be used. Median filtering, denoising, or impulsive behavior removal may be applied to a train of similarity measure, or a train of consecutive "unusual" behavior.

In periodic updating, the following may be applied periodically (e.g. at the end of each period). The FIFO buffer may be checked for fullness and/or consistency. Updating may be applied if (1) the CSI in the FIFO buffer is consistent. Updating may be applied if (2) the FIFO buffer is sufficiently full (e.g. 80% full) with sufficient amount of CSI for training. Updating may be applied if both conditions (1) and (2) are satisfied. The CSI in the FIFO buffer may be considered consistent if a variance of the CSI is smaller than a threshold, or if a maximum pairwise distance of the CSI is smaller than a threshold. Regardless of the decision whether to update or not, the FIFO buffer may be flushed (emptied) to prepare for new CSI collection for the next period. If no updating is performed, the TR system may alert the user that automatic updating failed. The TR system may alert the user that manual retraining may be advised and/or needed.

When the TR system switches to another alert state (e.g. from "all doors closed" to "front door open"), the FIFO buffer may be flushed (emptied) and be used to store CSI in the new alert state (e.g. "front door open").

Updating may be applied to selected alert state only (e.g. normal state, "all doors close").

FIG. 1 shows a block diagram of a multiple-input single-output TRDMA downlink system according to an exemplary embodiment, in which there are N users (or also referred to as receivers) receiving statistically independent messages $\{X_1[k], X_2[k], \ldots, X_N[k]\}$ from a base station, via wireless channels. The base station includes a conversion module and the time reversal mirror (TRM) comprising plural TRMs. The TRM shown in FIG. 1 is a device that can record and time-reverse (and conjugate if complex-valued) a received waveform, which will be used to modulate the time-reversed waveform with an input signal by convolving them together in the following transmission phase. During the channel probing phase, the N intended users first take turns to transmit an impulse signal to the BS. Meanwhile, the TRMs at the BS record the channel response of each link and store the time-reversed and conjugated version of each channel response for the transmission phase. After the channel probing phase, the transmission phase is initiated. At the BS, each of $\{X_1[k], X_2[k], \ldots, X_N[k]\}$ f represents a sequence of information symbols that are independent complex random variables. The rate back-off factor D is introduced as the ratio of the sampling rate to the baud rate, by performing up-sampling and down-sampling with a factor D at the rate conversion module of the B S and the rate conversion module at the receivers. These sequences are first up-sampled by a factor of D at the rate conversion module of the BS. Then the up-sampled sequences are fed into the bank of TRMs. After that, all the outputs of the TRM bank are added together at adder and then the combined signal is transmitted into wireless channels. The signal energy is concentrated in a single time sample and the i-th receiver simply performs a one-tap gain adjustment to the received signal using the adjustment module to recover the signal and then down-samples it with the same factor D using the rate conversion module, ending up with $\{Y_i[k]\}$.

Figure 2:
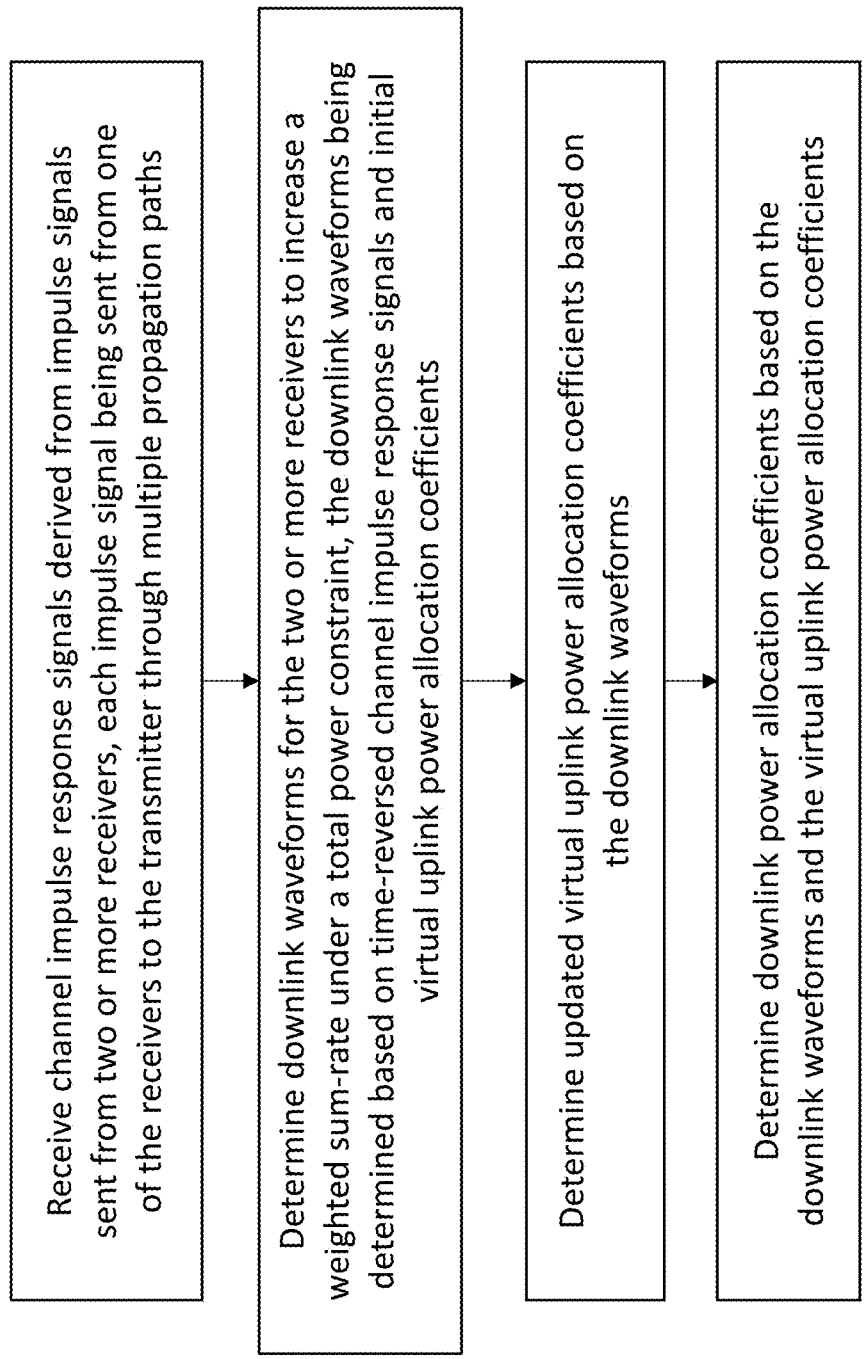
FIG. 2 is a flowchart of an exemplary procedure for implementing iterative weighted sum rate optimization for waveform design in a Time Reversal Division Multiple Access system.

FIG. 2 is a flowchart of an exemplary procedure for implementing an iterative weighted sum rate optimization in a TRDMA downlink system. A transmitter receives channel impulse response signals derived from impulse signals sent from two or more receivers, each impulse signal being sent from one of the receivers to the transmitter through multiple propagation paths. Downlink waveforms for the two or more receivers are determined so as to increase a weighted sum-rate under a total power constraint, the downlink waveforms being determined based on time-reversed channel impulse response signals and initial virtual uplink power allocation coefficients. Updated virtual uplink power allocation coefficients are determined (based on the downlink waveforms. Downlink power allocation coefficients are determined based on the downlink waveforms and the virtual uplink power allocation coefficients.

Figure 3:
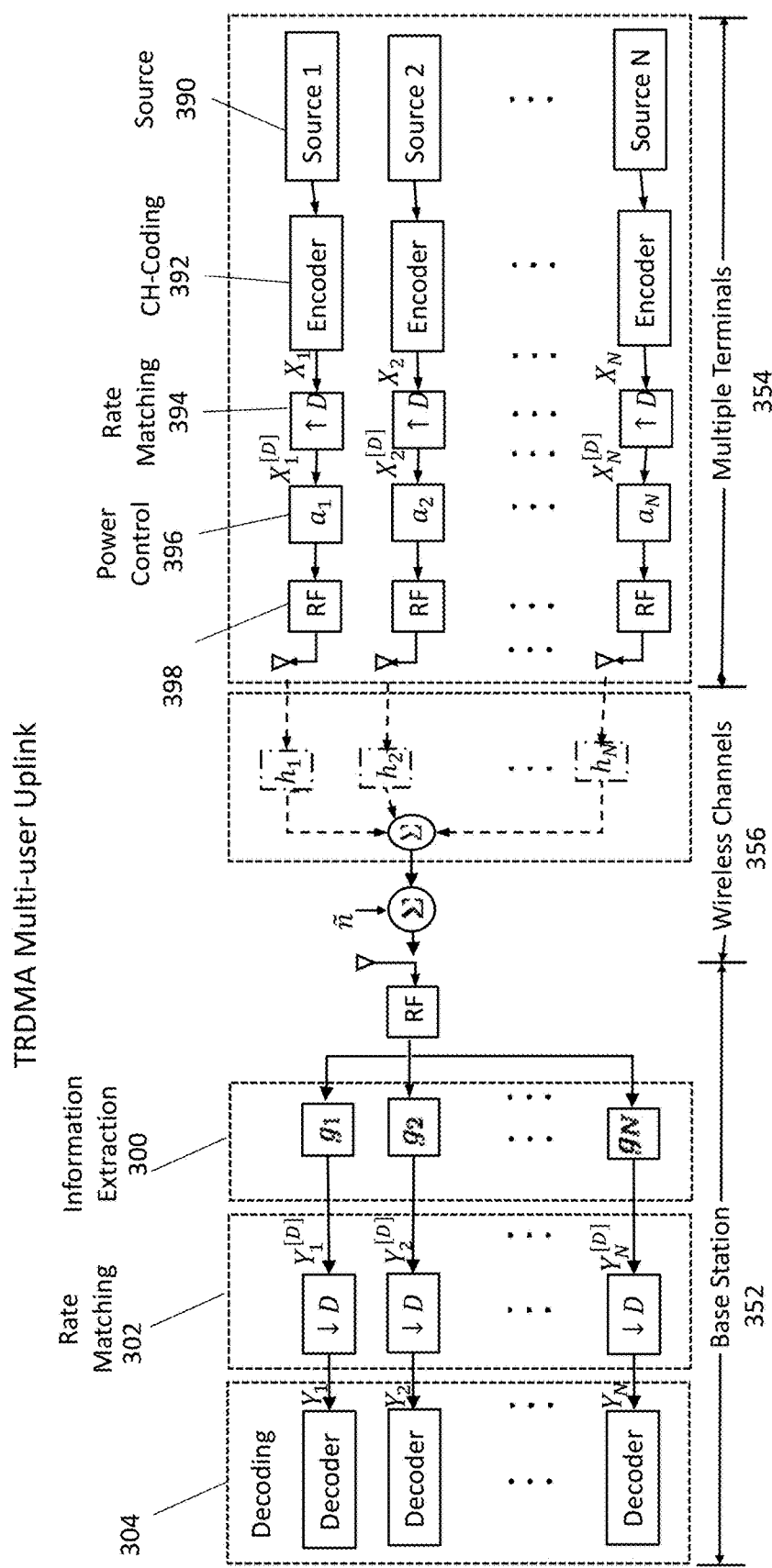
FIG. 3 is a diagram showing an uplink transmission process in a Time Reversal Division Multiple Access system.
Figure 4:
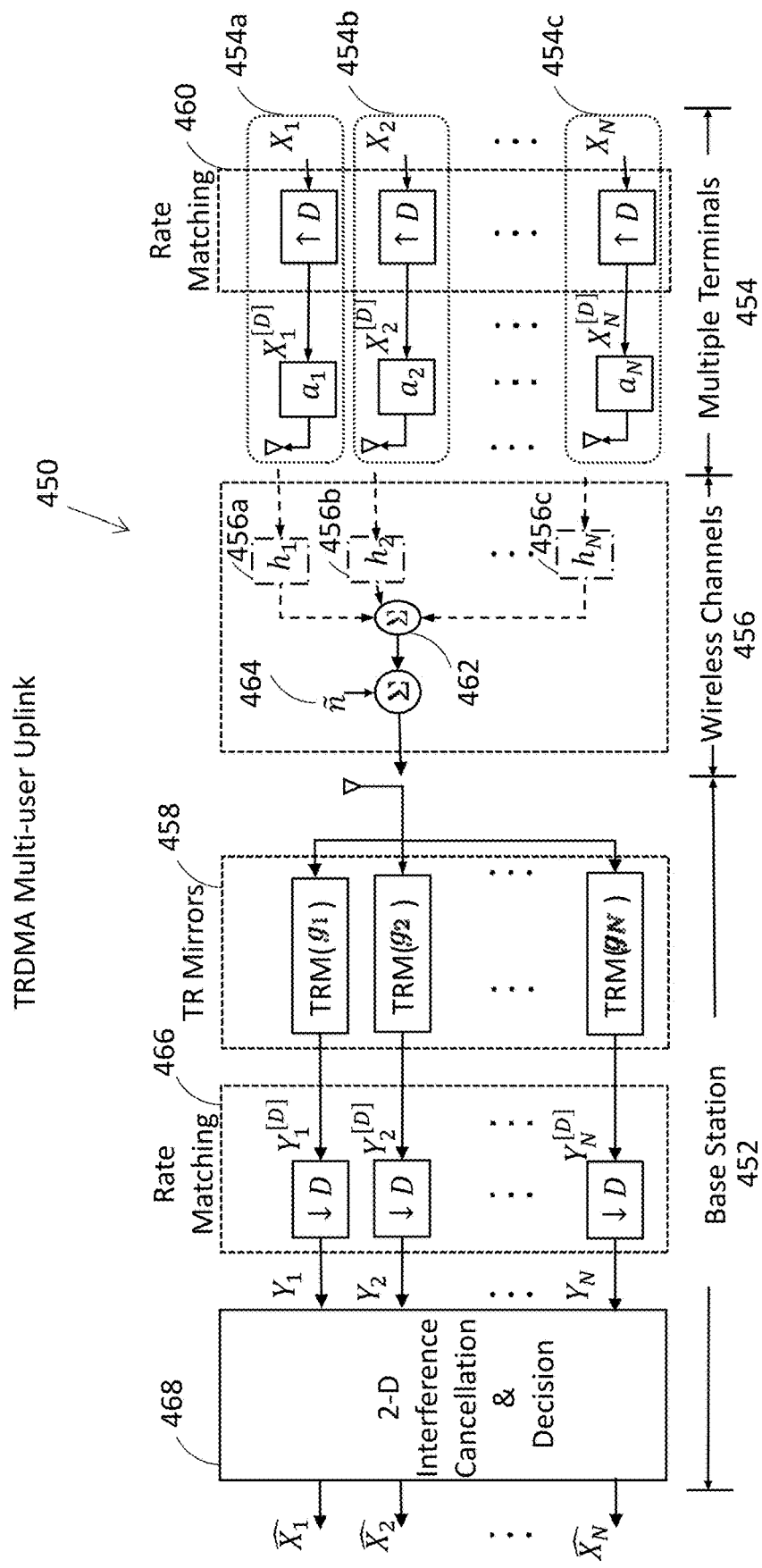
FIG. 4 is a diagram of an exemplary multi-user time reversal communication system with interference cancellation and decision.
Figure 5:
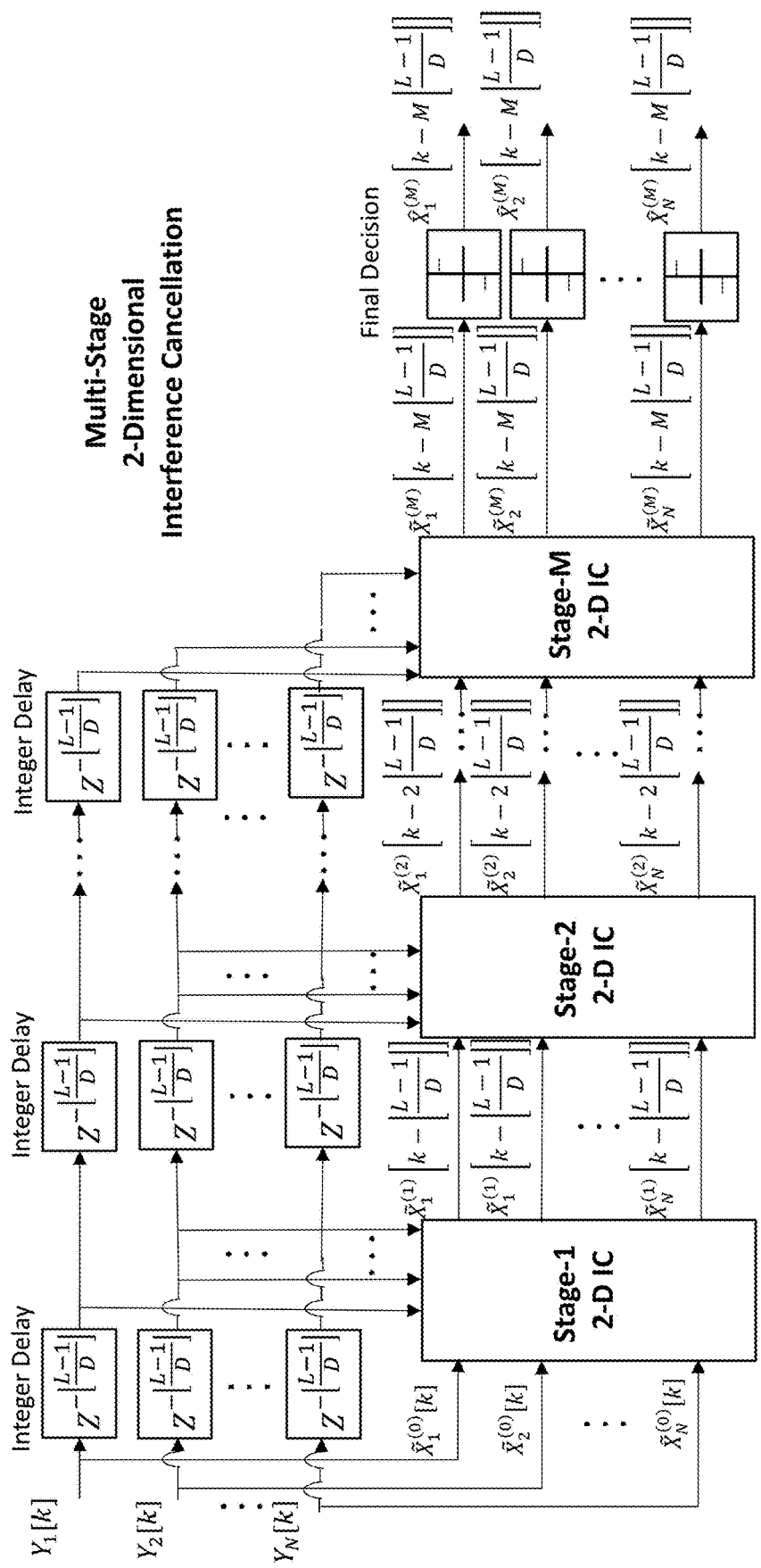
FIG. 5 is a diagram showing a multi-stage 2D interference cancellation and decision module.
Figure 6:
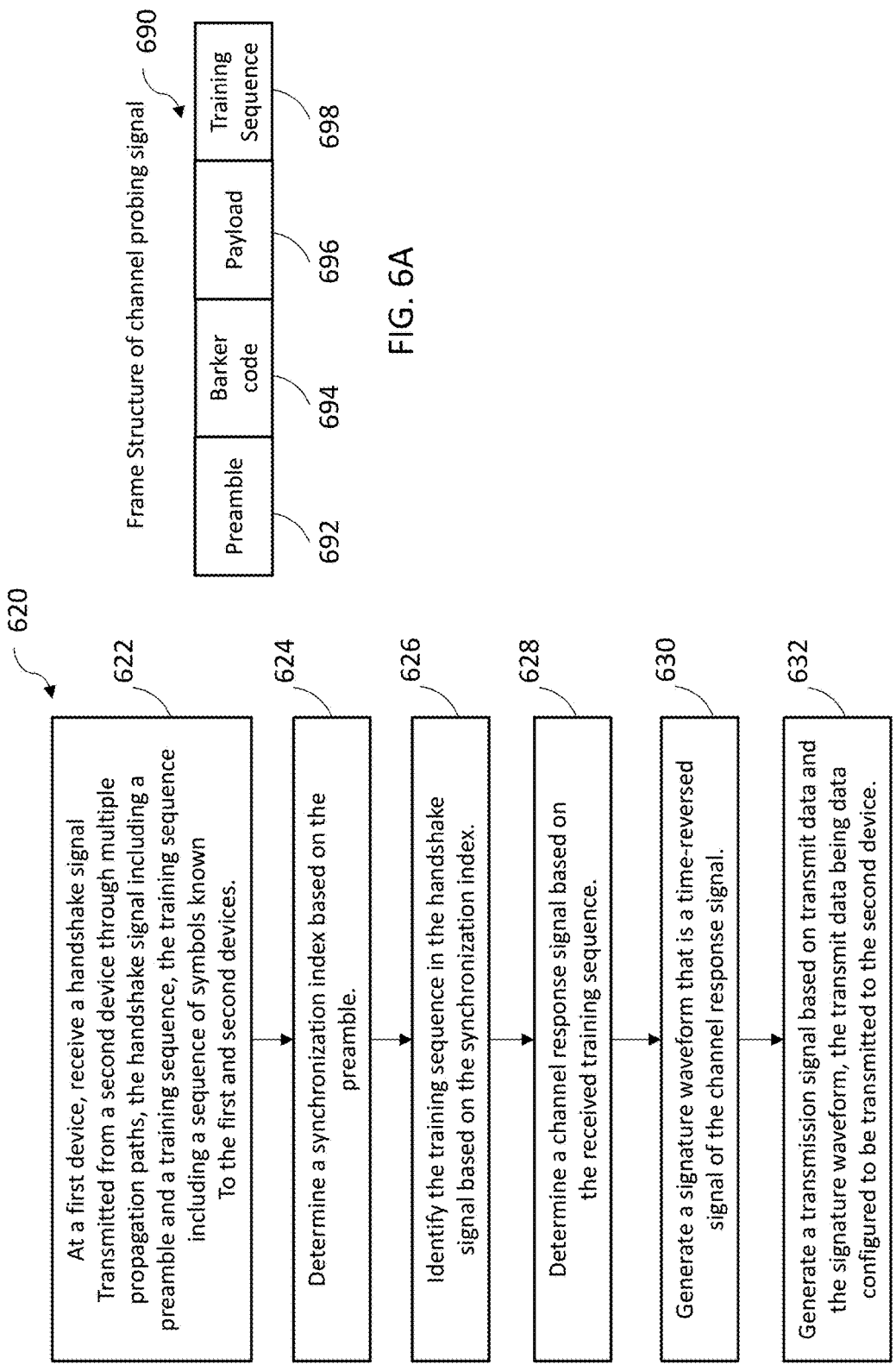
FIG. 6A is a diagram of a frame structure of a channel probing signal.
FIG. 6B is a flow diagram of a process for time-reversal wireless communication using a handshaking procedure to provide accurate timing synchronization between devices.
Figure 7:
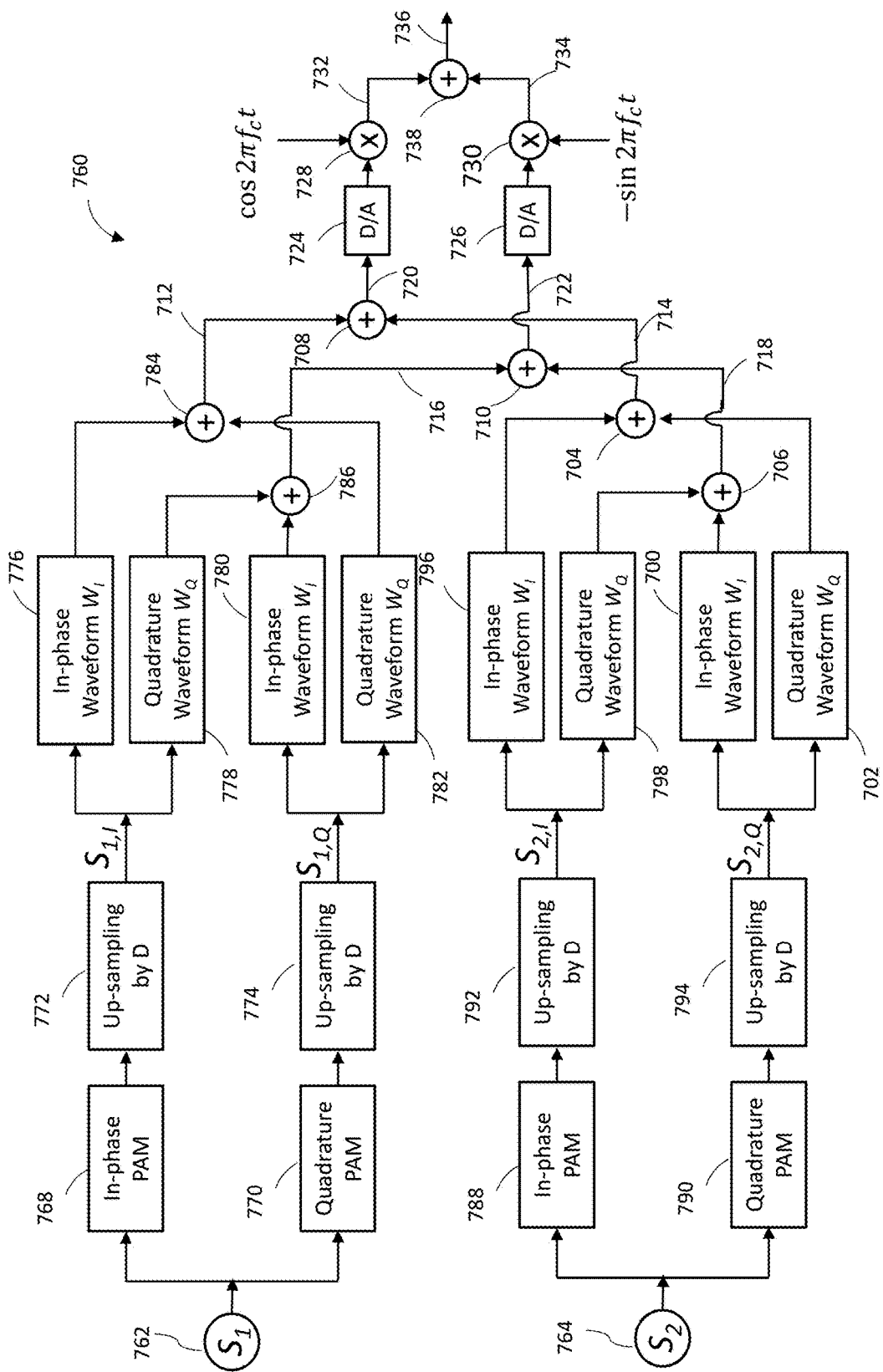
FIG. 7 is a block diagram of a transmitter that generates downlink signals for multiple devices in a Time Reversal Division Multiple Access system.
Figure 8:
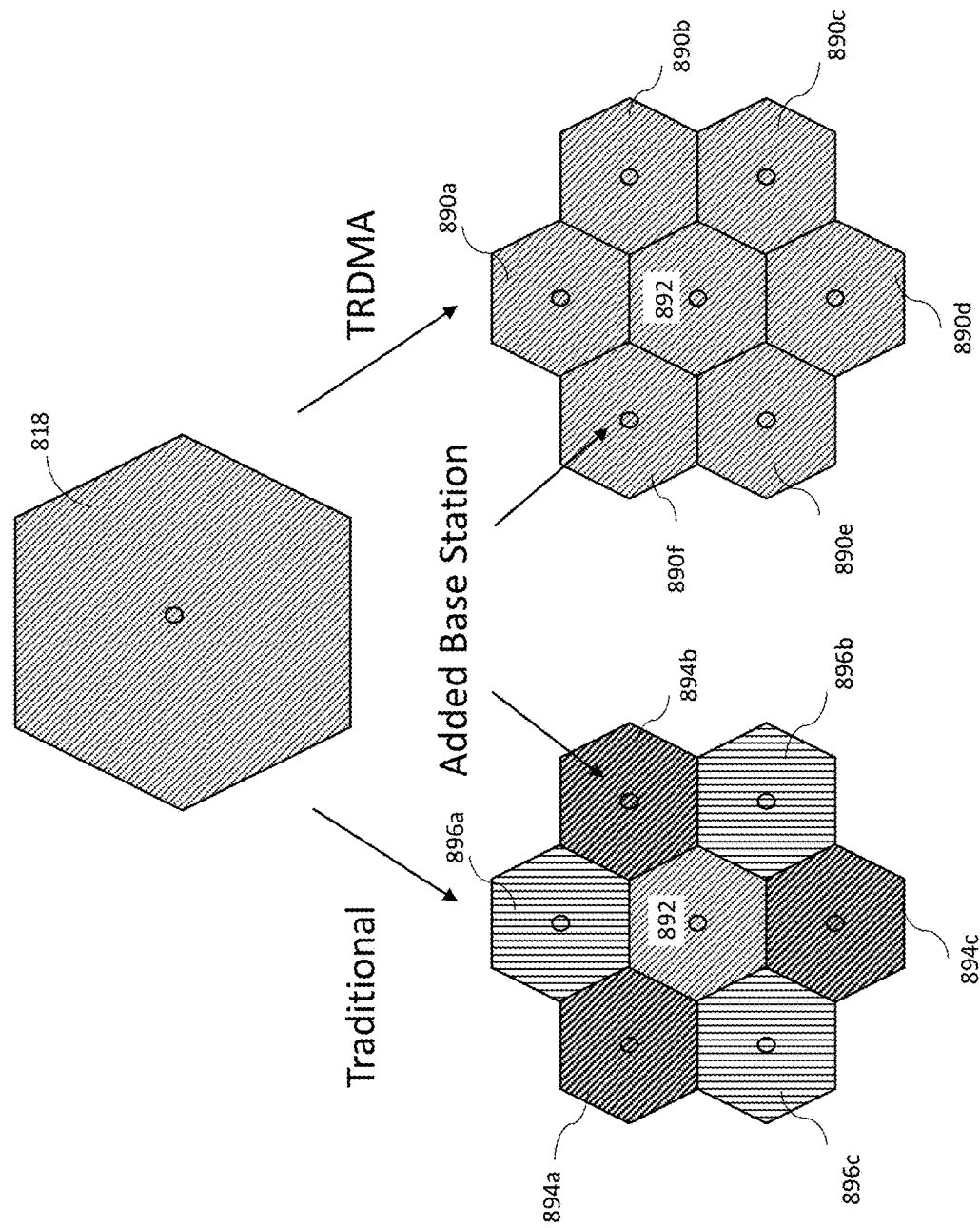
FIG. 8 is a diagram of spectrum re-use in time-reversal division multiple access system.
Figure 9:
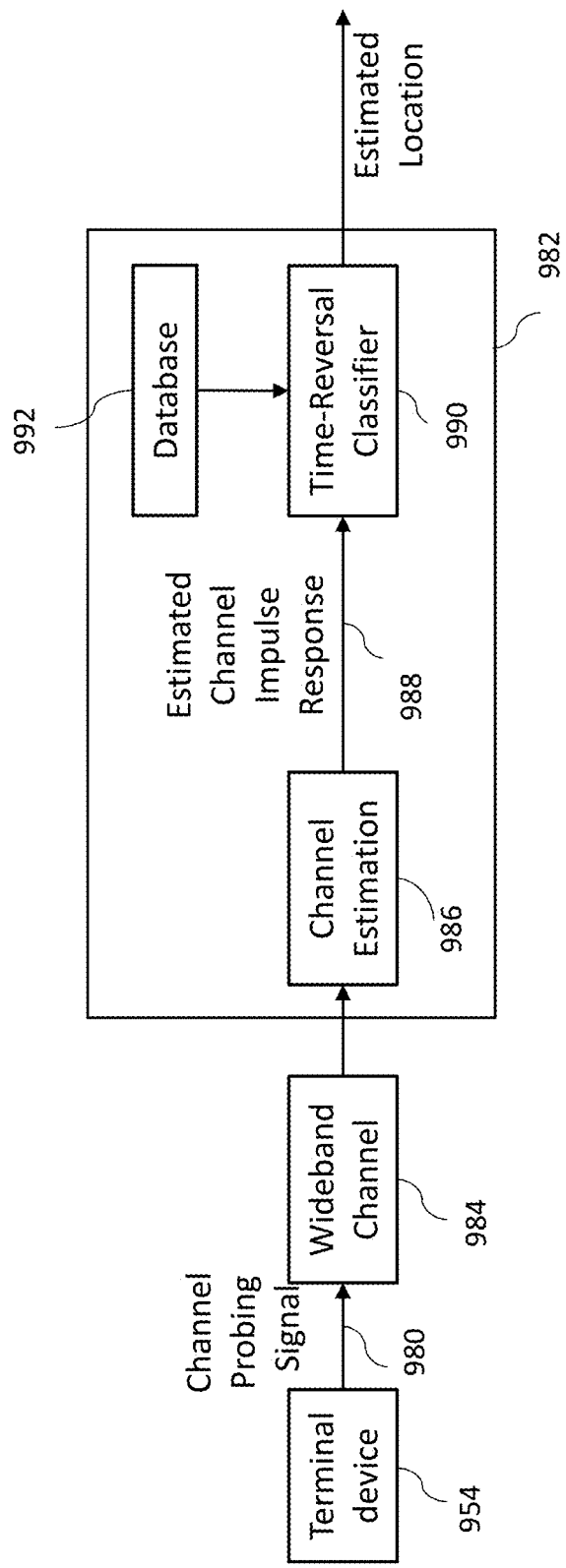
FIG. 9 is a diagram of an implementation of an exemplary time-reversal positioning system.
Figure 11:
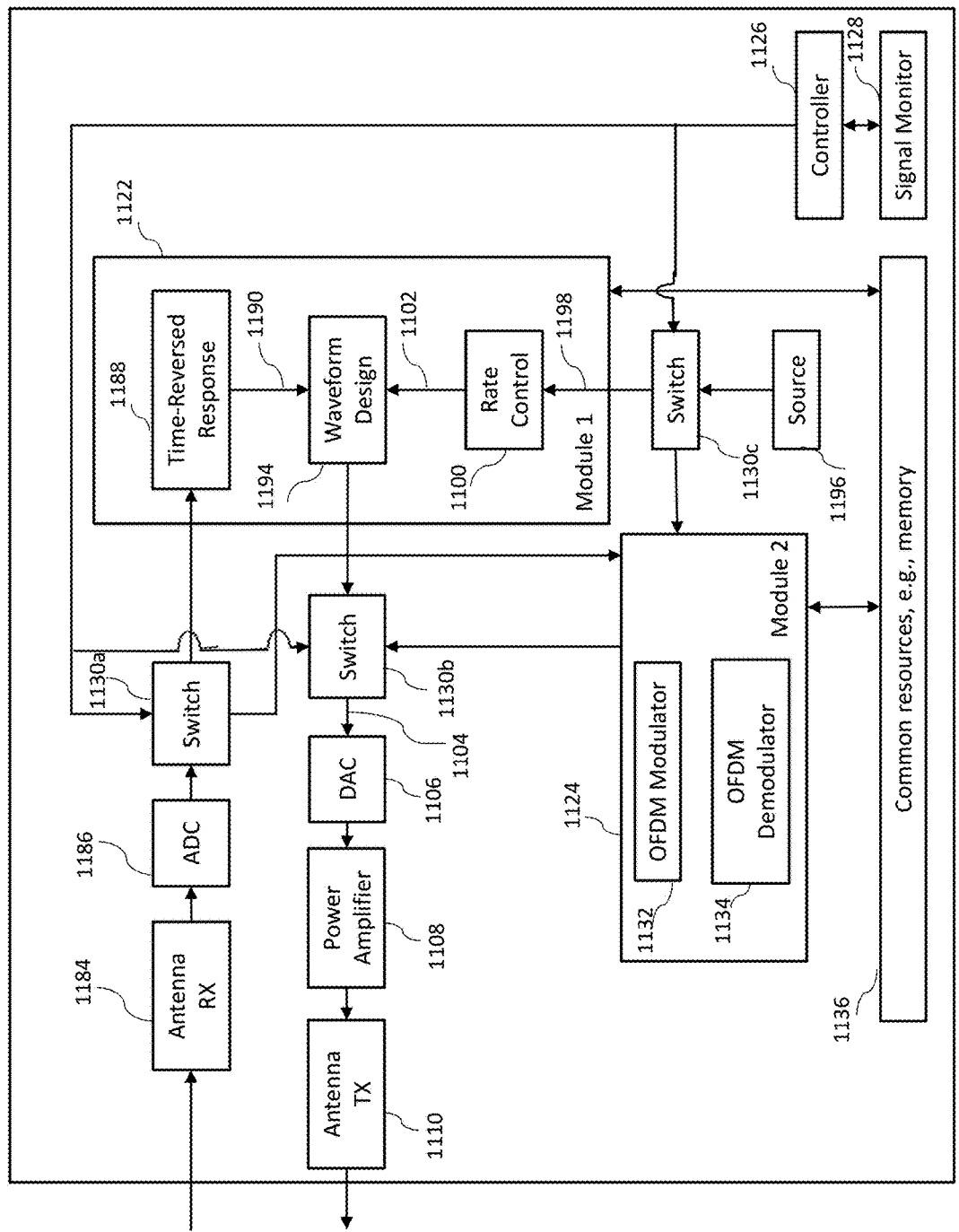
FIG. 11 is a diagram of exemplary hybrid time-reversal systems that include a first communication module capable of supporting the Time Reversal Division Multiple Access protocol and a second communication module capable of supporting a second communication protocol.
Figures 12, 13:
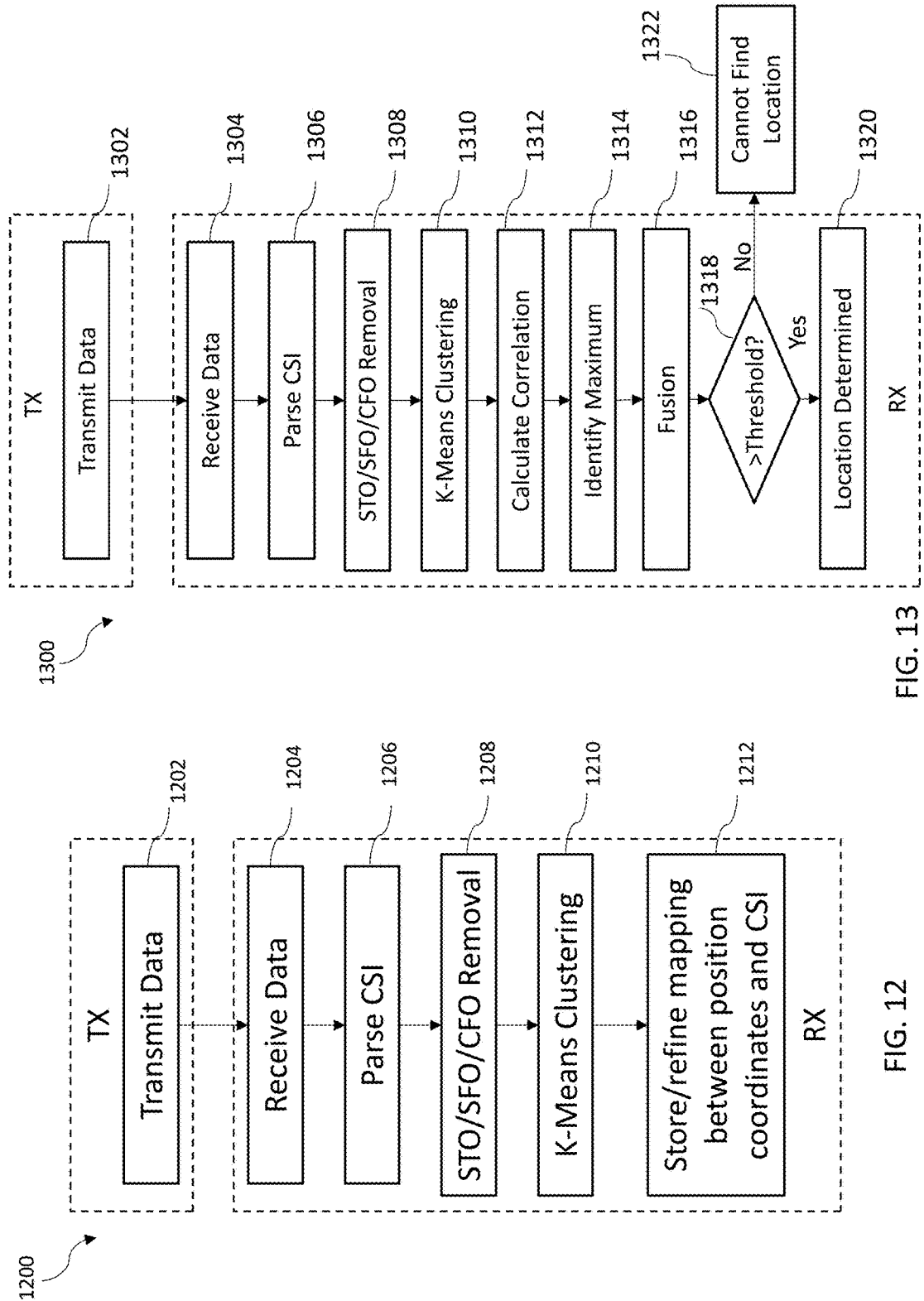
FIGS. 12 and 13 show a flow diagram that illustrates a training phase methodology and a localization phase methodology.
Figure 14:
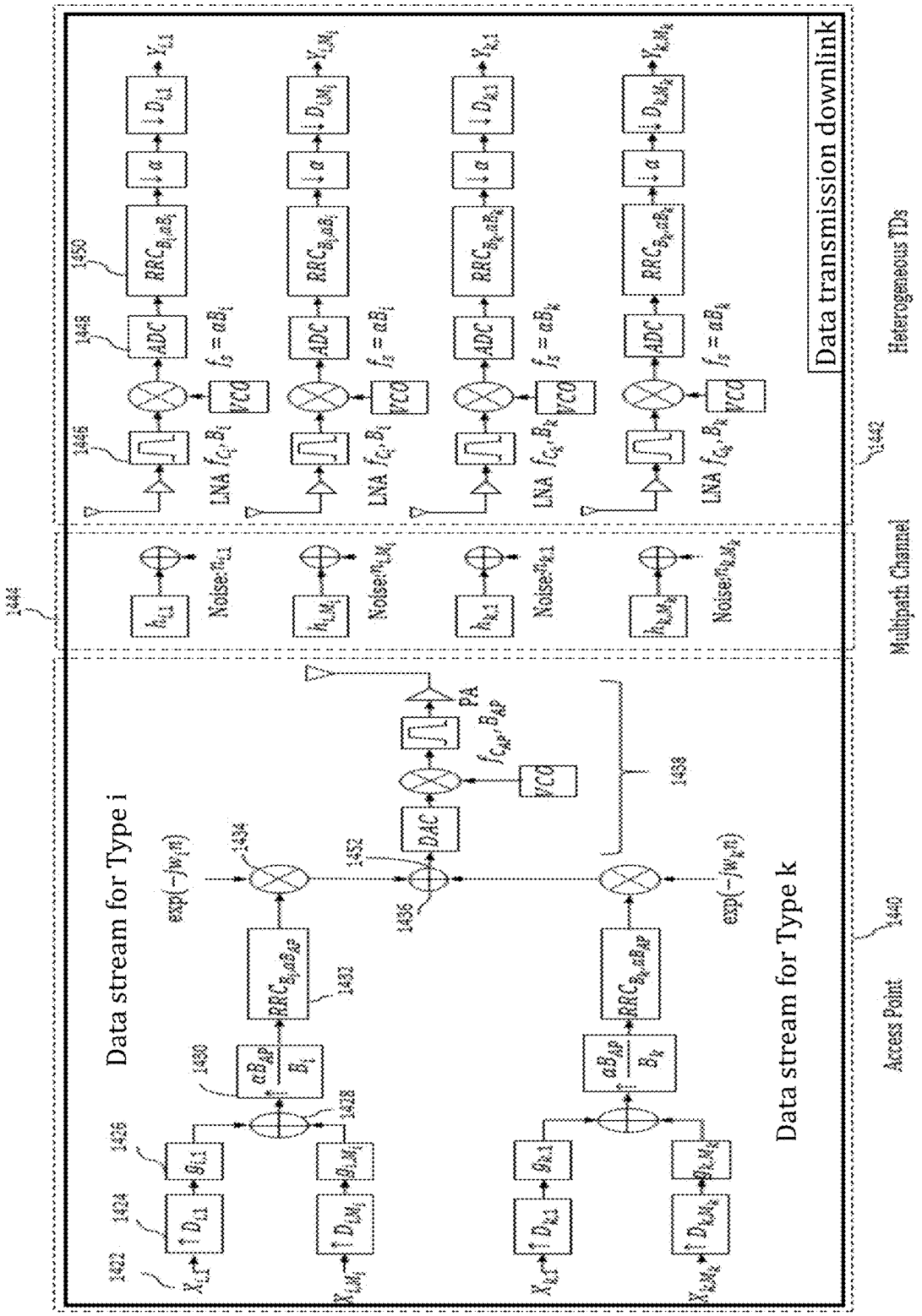
FIG. 14 is a diagram of an exemplary time-reversal division multiple access downlink system with heterogeneous devices.
Figure 15:
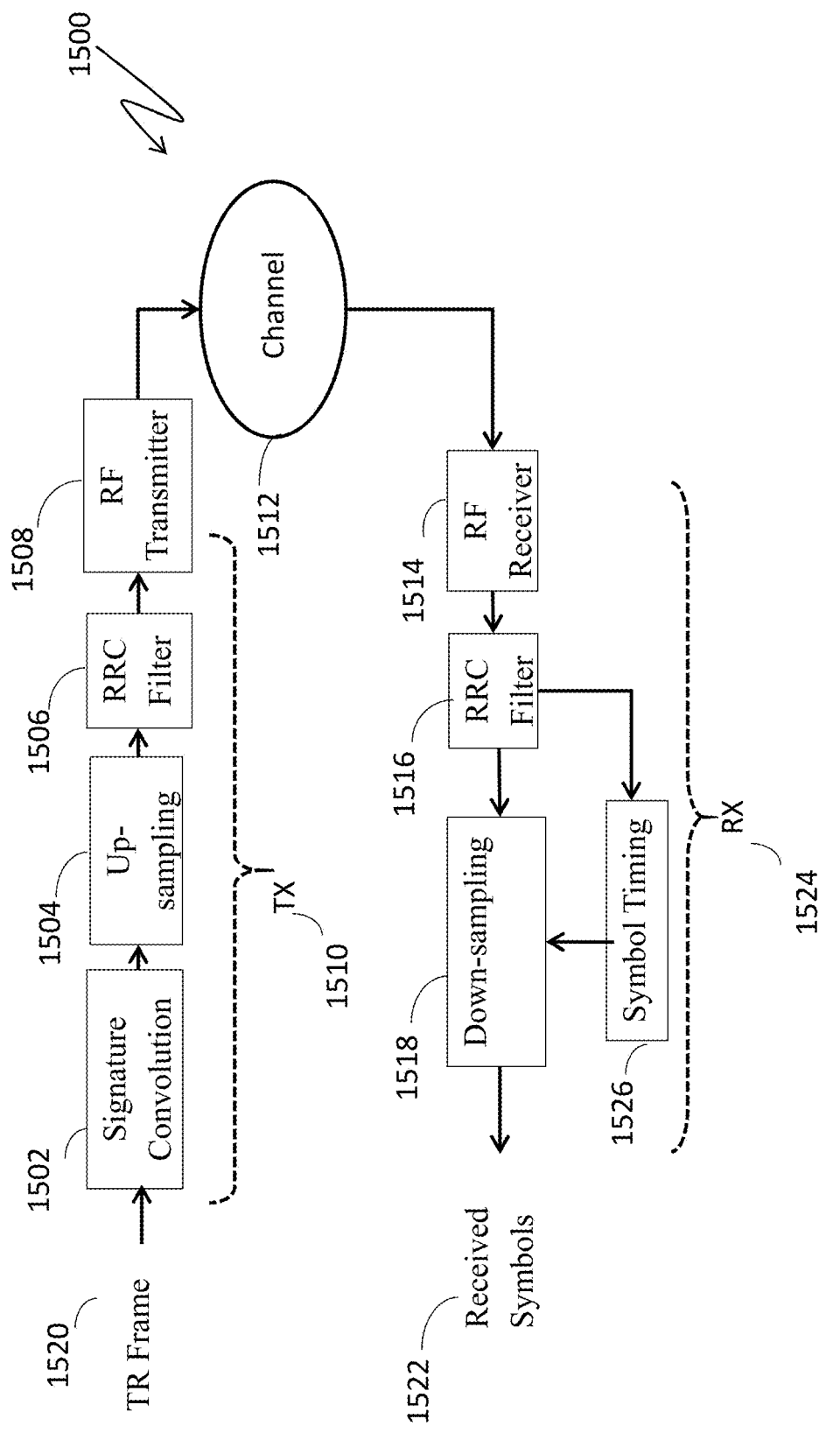
FIG. 15 is a diagram of an exemplary transmitter (TX) and receiver (RX) architecture for time-reversal systems with signature design (SD) in downlink.

Referring to FIG. 3, for the uplink, assume the N users transmit their own data to the base station concurrently. Each user has its own information source which is independent of others. At each user, the information bits are first encoded by the channel coding block. Then the coded symbols $\{X_i[k]\}$ are upsampled by the rate back-off factor D for rate matching at the rate matching module. The scaling factors $\{a_i\}$ are used to implement the power control at the power control module. After multiplying with scaling factor, the sequence of $a_i\{X_i^{[D]}[k]\}$ is transmitted by the RF module. When the sequence $a_i\{X_i^{[D]}[k]\}$ propagates through its wireless channel $\{h_i[k]\}$, the convolution between $a_i\{X_i^{[D]}[k]\}$ and the channel impulse response $\{h_i[k]\}$ is automatically taken as the channel output for the i-th user. Since each user's multipath channel response is unique, the automatic convolution between the $a_i\{X_i^{[D]}[k]\}$ and $\{h_i[k]\}$ is automatically equivalent to the base station's signature embedding process in the downlink. All of the channel outputs for the N users are mixed together in the air plus the additive noise at the base station. Upon receiving the mixed signal, the base station passes this mixed signal through an information extraction module that includes a filter bank of the calculated signature waveforms $h_i$, each of which performs the convolution between its input signal and the corresponding user's signature waveform. Such a convolution using the signature waveform extracts the useful signal component and suppresses the signals of other users. The rate matching is performed by down-sampling (with the same factor D) the filter bank's output signal at the rate matching module to recover the original symbol of each user. Based on $\{Y_i[k]\}$, an estimation about $\{X_i[k]\}$ is made. Then the estimated/reconstructed symbol sequence is fed into the corresponding decoder to recover the information bits from each user at the base station.

What is claimed is:

1. A time-reversal system, comprising:
a first wireless transceiver of a time-reversal client wirelessly coupled to at least one second wireless transceiver through a wireless multipath channel associated with a space;
the at least one second wireless transceiver;
the time-reversal client with the first wireless transceiver, comprising a processor and a memory configured, in a channel probing phase, to:
obtain a set of channel information (CI) captured when at least one probing signal is sent either from the first wireless transceiver to the at least one second wireless transceiver, or from the at least one second wireless transceiver to the first wireless transceiver, through the wireless multipath channel associated with the space,
wherein each of the set of CI comprises at least one of: a channel state information (CSI), a channel impulse response, a channel frequency response, or another channel state data of the wireless multipath channel, and
obtain a set of location-specific signatures based on the set of CI and a time reversal operation; and
at least one third wireless transceiver wirelessly coupled with the first wireless transceiver of the time-reversal client through a wireless multipath channel associated with the space;
wherein all of the at least one second wireless transceivers and all of the at least one third wireless transceivers have the same passband;
wherein each location-specific signature is associated with a CI;
wherein the channel probing phase is a training phase of a positioning task to capture the set of location-specific signatures associated with a set of locations;
wherein an instantaneous location of each of the at least one third wireless transceiver is to be determined in an operating phase of the positioning task based on an instantaneous set of—CI and the location-specific signatures obtained in the training phase of the positioning task each associated with a location in the space;
wherein, in the training phase, the at least one second wireless transceiver is moved to different locations in the space to capture, for each location, at least one CI and at least one corresponding location-specific signature,
wherein, in the operating phase, each of the at least one third wireless transceiver is moved along a path in the space; and
wherein the time-reversal client is further configured to, in the operating phase:
obtain the instantaneous set of CI captured when at least one probing signal is sent from at least one of: the first wireless transceiver or each of the at least one third wireless transceiver at a location of the path, to at least one of: the each of the at least one third wireless transceiver at the location of the path or the first wireless transceiver, through the wireless multipath channel associated with the space, and
compare the instantaneous set of CI with the set of location-specific signatures using a similarity metric to identify the location of the path as a location associated with a matching location-specific signature.

2. The time-reversal system of claim 1:
wherein the time-reversal client is further configured to, in a data transmission phase: determine, using the processor and the memory, that at least one information sequence is intended to be transmitted each to respective second wireless transceiver,
up-sample the at least one information sequence,
generate at least one downlink signal each based on respective up-sampled information sequence and respective location-specific signature associated with respective second wireless transceiver,
obtain a combined downlink signal by adding the at least one downlink signal,
generate a combined radio frequency (RF) signal based on the combined downlink signal, and transmit the combined RF signal from the first wireless transceiver to the at least one second wireless transceiver through the wireless multipath channel associated with the space such that respective downlink signals focus at respective second wireless transceivers;

wherein a particular second wireless transceiver is configured to, in the data transmission phase, receive a received signal which is the combined downlink signal, gain-adjust the received signal, and down-sample the gain-adjusted received signal to extract information sequence intended for the particular second wireless transceiver.

3. The time-reversal system of claim 2:

wherein the time-reversal client is further configured to, in the data transmission phase:

generate the at least one downlink signal each based on the respective up-sampled information sequence and respective downlink waveform associated with respective second wireless transceiver to maximize a weighted sum of downlink data rate associated with all of the at least one second wireless transceiver, wherein the respective downlink waveform is chosen based on the set of CI, the time reversal operation on the set of Cl, and an iterative optimization of downlink waveforms and downlink power allocation for all downlinks to the at least one second wireless transceiver under total power constraint of the first wireless transceiver.

4. The time-reversal system of claim 1:

wherein each of the at least one second wireless transceiver is configured to, in a data transmission phase, send an uplink information sequence wirelessly to the first wireless transceiver through the wireless multipath channel associated with the space simultaneously;

wherein the time-reversal client is further configured to, in the data transmission phase:

obtain a received combined signal comprising the at least one uplink information sequence from the at least one second wireless transceiver, and determine each respective uplink information sequence from respective second wireless transceiver based on a convolution of the received combined signal and the respective set of location-specific signature associated with the respective second wireless transceiver.

5. The time-reversal system of claim 4:

wherein two second wireless transceivers, in a data transmission phase, are each configured to send a respective information sequence wirelessly to the first wireless transceiver through the wireless multipath channel associated with the space simultaneously;

wherein the time-reversal client is further configured to, in the data transmission phase: obtain a received combined signal comprising the two information sequences from the two second wireless transceivers, determine two initial estimated information sequences each associated with respective second wireless transceiver based on a convolution of the received signal and the respective set of location-specific signature associated with the respective second wireless transceiver, determine interference based on at least one of the two initial estimated information sequences, and determine a refined estimated information sequence associated with a particular one of the two second wireless transceivers by canceling the interference from the information sequence of the particular second wireless transceiver.

6. The time-reversal system of claim 1:

wherein a particular second wireless transceiver is configured to send a particular probing signal to the first wireless transceiver through the wireless multipath channel associated with the space;

wherein the particular probing signal is configured to comprise two parts: a preamble and a training sequence, both known to the first wireless transceiver and the particular second wireless transceiver;

wherein the first wireless transceiver is configured to:

in the channel probing phase, receive the particular probing signal, synchronize with the particular probing signal by determining a synchronization index based on the preamble of the particular probing signal, identify the training sequence of the particular probing signal based on the synchronization index and the known preamble, determine a particular Cl, generate a particular location-specific signature waveform for the particular second wireless transceiver based on time reversing the particular Cl, and in a data transmission phase, generate a transmission signal based on an information sequence and the particular location-specific signature waveform.

7. The time-reversal system of claim 2:

wherein the time-reversal client is further configured to, in the data transmission phase: generate the at least one downlink signal based on quadrature amplitude modulation (QAM).

8. The time-reversal system of claim 2:

wherein a third wireless transceiver of another time-reversal client is wirelessly coupled with at least one of: the particular second wireless transceiver or another wireless transceiver, through another wireless multipath channel associated with another space in a vicinity of the space;

wherein, in the data transmission phase, the third wireless transceiver of the another time-reversal client is configured to transmit another RF signal to at least one of: the particular second wireless transceiver or another wireless transceiver, through the another wireless multipath channel associated with the another space in the vicinity of the space; and wherein the first wireless transceiver and the third wireless transceiver transmit in a band simultaneously.

9. The time-reversal system of claim 1, wherein the time-reversal client is further configured to, in a data transmission phase:

determine, using the processor and the memory, that at least one sequence of data symbols is intended to be transmitted to the at least one respective second wireless transceiver, estimate inter-symbol interference (ISI) experienced by the at least one second wireless transceiver when the at least one sequence of data symbols are received by the at least one second wireless transceiver, modify the at least one sequence of data symbols based on respective channel information and the estimated ISI to reduce the ISI experienced by the at least one second wireless transceiver, generate at least one downlink signal based on the at least one sequence of modified data symbols and at least one respective signature waveform, generate a combined RF signal based on the at least one downlink signal, and transmit the combined RF signal from the first wireless transceiver to the at least one second wireless transceiver through the wireless multipath channel associated with the space such that respective downlink signals focus at respective second wireless transceivers.

10. The time-reversal system of claim 2, further comprising:
a controller configured to control an operation of the time-reversal client,
wherein the time-reversal client is configured to support a time-reversal division multi-access protocol and at least one other wireless communication protocol.

11. The time-reversal system of claim 8, wherein the first wireless transceiver and the third wireless transceiver transmit in the same passband simultaneously.

12. The time-reversal system of claim 1: wherein there are more than one second wireless transceivers;
wherein the more than one second wireless transceivers are heterogeneous such that the CI associated with the more than one heterogeneous second wireless transceivers are heterogeneous and the location-specific signatures are heterogeneous,
wherein the time-reversal client further comprises an analog-to-digital convertor circuit with a sampling frequency determined based on the wireless multipath channel;
wherein the time-reversal client configured to:
in the data transmission phase, receive using the first wireless transceiver a combined RF signal comprising more than one heterogeneous RF signals from the more than one second heterogeneous wireless transceivers, and
determine a sequences of heterogeneous data symbols associated with each of the more than one second heterogeneous wireless transceivers based on the received combined RF signal, the heterogeneous location-specific signatures, a heterogeneous second wireless transceiver bandwidth, and a heterogeneous second wireless transceiver center frequency.

13. The time-reversal system of claim 4:
wherein the time-reversal client is configured to, in the data transmission phase 7-te:
receive a first signal transmitted from a particular second wireless transceiver to the first wireless transceiver through the wireless multipath channel associated with the space, wherein the first signal is configured to comprise a preamble and a data frame in which the preamble is configured to include a known code sequence and the data frame Is configured to include a plurality of data symbols;
compute a second signal that represents an estimated equivalent channel response using the received first signal and the known code sequence;
down-sample the second signal;
compute a signal-to-interference-plus-noise ratio at a plurality of timing offsets; determine the symbol timing based on the timing offset associated with the largest computed signal-to-interference-plus-noise ratio; and
determine the data symbols in the data frame based on the determined symbol timing.

14. The time-reversal system of claim 3: wherein, in the data transmission phase, a particular second wireless transceiver is configured to:
receive a first signal transmitted from the first wireless transceiver to the particular second wireless transceiver through the wireless multipath channel associated with the space, wherein the first signal is configured to comprise a preamble and a data frame in which the preamble is configured to include a known code sequence and the data frame is configured to include a plurality of data symbols;
compute a second signal that represents an estimated equivalent channel response using the received first signal and the known code sequence; down-sampled the second signal;
compute a signal-to-interference-plus-noise ratio at a plurality of timing offsets; determine the symbol timing based on the timing offset associated with the largest computed signal-to-interference-plus-noise ratio; and
determine the data symbols in the data frame based on the determined symbol timing.

15. A method of a time-reversal system, comprising:
wirelessly coupling a first wireless transceiver of a time-reversal client to at least one second wireless transceiver through a wireless multipath channel associated with a space;
obtaining a set of channel information (CI) using a processor and a memory of the time-reversal client, the set of CI captured when at least one probing signal is sent either from the first wireless transceiver to the at least one second wireless transceiver, or from the at least one second wireless transceiver to the first wireless transceiver, through the wireless multipath channel associated with the space,
wherein each of the set of CI comprises at least one of: a channel state information (CSI), a channel impulse response, a channel frequency response, or another channel state data of the wireless multipath channel;
obtaining a set of location-specific signatures based on the set of CI and a time reversal operation; and
wirelessly coupling the first wireless transceiver of the time-reversal client with at least one third wireless transceiver through a wireless multipath channel associated with the space;
wherein all of the at least one second wireless transceivers and all of the at least one third wireless transceivers have the same passband;
wherein each location-specific signature is associated with a CI;
wherein the channel probing phase is a training phase of a positioning task to capture the set of location-specific signatures associated with a set of locations;
wherein an instantaneous location of each of the at least one third wireless transceiver is to be determined in an operating phase of the positioning task based on an instantaneous set of—CI and the location-specific signatures obtained in the training phase of the positioning task each associated with a location in the space;
wherein, in the training phase, the at least one second wireless transceiver is moved to different locations in the space to capture, for each location, at least one CI and at least one corresponding location-specific signature;
wherein, in the operating phase, each of the at least one third wireless transceiver is moved along a path in the space;
wherein the time-reversal client is further configured to, in the operating phase;
obtain the instantaneous set of CI captured when at least one probing signal is sent from at least one of: the first wireless transceiver or each of the at least one third wireless transceiver at a location of the path, to at least one of: the each of the at least one third wireless transceiver at the location of the path or the first wireless transceiver, through the wireless multipath channel associated with the space, and compare the instantaneous set of CI with the set of location-specific signatures using a similarity metric to identify the location of the path as a location associated with a matching location-specific signature.

16. The method of the time-reversal system of claim 15: wherein the time-reversal client is further configured to, in a data transmission phase: determine, using the processor and the memory, that at least one information sequence is intended to be transmitted each to respective second wireless transceiver, up-sample the at least one information sequence, generate at least one downlink signal each based on respective up-sampled information sequence and respective location-specific signature associated with respective second wireless transceiver, obtain a combined downlink signal by adding the at least one downlink signal, generate a combined radio frequency (RF) signal based on the combined downlink signal, transmit the combined RF signal from the first wireless transceiver to the at least one second wireless transceiver through the wireless multipath channel associated with the space such that respective downlink signals focus at respective second wireless transceivers;

wherein a particular second wireless transceiver, is configured to, in the data transmission phase, receive a received signal which is the combined downlink signal, gain-adjust the received signal, and down-sample the gain-adjusted received signal to extract information sequence intended for the particular second wireless transceiver.

17. The method of the time-reversal system of claim 15:
wherein the time-reversal client is further configured to, in the data transmission phase:

generate the at least one downlink signal each based on the respective up-sampled information sequence and respective downlink waveform associated with respective second wireless transceiver to maximize a weighted sum of downlink data rate associated with all of the at least one second wireless transceiver, wherein the respective downlink waveform is chosen based on the set of CI, the time reversal operation on the set of CI, and an iterative optimization of downlink waveforms and downlink power allocation for all downlinks to the at least one second wireless transceiver under total power constraint of the first wireless transceiver.

18. The method of the time-reversal system of claim 15:
wherein each of the at least one second wireless transceiver is configured to, in a data transmission phase, send an uplink information sequence wirelessly to the first wireless transceiver through the wireless multipath channel associated with the space simultaneously;

wherein the time-reversal client is further configured to, in the data transmission phase:

obtain a received combined signal comprising the at least one uplink information sequence from the at least one second wireless transceiver, and determine each respective uplink information sequence from respective second wireless transceiver based on a convolution of the received combined signal and the respective set of location-specific signature associated with the respective second wireless transceiver.

* * * * *